US011282169B2

(12) United States Patent
Cochran et al.

(10) Patent No.: US 11,282,169 B2
(45) Date of Patent: Mar. 22, 2022

(54) METHOD AND APPARATUS FOR PROCESSING AND DISTRIBUTING LIVE VIRTUAL REALITY CONTENT

(71) Applicant: Intel Corporation, Santa Clara, CA (US)

(72) Inventors: Wayne Cochran, Ridgefield, WA (US); Fai Yeung, Palo Alto, CA (US); Durga Raj Mathur, Pleasanton, CA (US); Gilson Goncalves De Lima, San Francisco, CA (US); Patrick Youngung Shon, Milpitas, CA (US); John A. Harrison, Santa Clara, CA (US); Ok Joon Kim, Cupertino, CA (US); Harleen Gill, Los Altos, CA (US); Kyle Siehl, Sunnyvale, CA (US); Uma Jayaram, Santa Clara, CA (US); Sankar Jayaram, Santa Clara, CA (US); Archie Sharma, Folsom, CA (US); Gockcen Clingir, San Jose, CA (US); Stanley Baran, Chandler, AZ (US); Mayuresh Varerkar, Folsom, CA (US); Barnan Das, Newark, CA (US); Narayan Biswal, Folsom, CA (US); Nilesh Shah, Folsom, CA (US); Ritesh Kale, Cupertino, CA (US); Greg Weinstein, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/958,698

(22) PCT Filed: Jan. 24, 2019

(86) PCT No.: PCT/US2019/014862
§ 371 (c)(1),
(2) Date: Jun. 27, 2020

(87) PCT Pub. No.: WO2019/156819
PCT Pub. Date: Aug. 15, 2019

(65) Prior Publication Data
US 2020/0349672 A1 Nov. 5, 2020

Related U.S. Application Data

(60) Provisional application No. 62/627,747, filed on Feb. 7, 2018.

(51) Int. Cl.
*G06T 3/40* (2006.01)
*G06T 7/00* (2017.01)
(Continued)

(52) U.S. Cl.
CPC .............. *G06T 3/4038* (2013.01); *G06T 7/97* (2017.01); *G06T 15/08* (2013.01); *G06T 19/006* (2013.01)

(58) Field of Classification Search
None
See application file for complete search history.

(56) References Cited

U.S. PATENT DOCUMENTS 6,359,617 B1 * 3/2002 Xiong ................... G06T 3/0068
715/848
2007/0110335 A1 * 5/2007 Taylor ..................... G06T 11/60
382/284

(Continued)

FOREIGN PATENT DOCUMENTS

KR 10-1764063 B1 8/2017

OTHER PUBLICATIONS

International Preliminary Report on Patentability, PCT App. No. PCT/US2019/014862, dated Aug. 20, 2020, 8 pages.

(Continued)

Primary Examiner — Steven Z Elbinger
(74) Attorney, Agent, or Firm — Nicholson De Vos Webster & Elliott LLP

(57) ABSTRACT

An apparatus, system, and method are described for providing real-time capture, processing, and distribution of panoramic virtual reality (VR) content. One embodiment of a (Continued)

graphics processor comprises a video interface to receive a plurality of images from a corresponding plurality of cameras; an image rectifier to perform a perspective re-projection of at least some of the images to a common image plane to generate a rectified plurality of images; a stitcher to analyze overlapping regions of adjacent images in the rectified images and to identify corresponding pixels in the overlapping regions and to stitch the adjacent images in accordance with the corresponding pixels to generate a panoramic image comprising a stitched combination of the rectified plurality of images; and a cylindrical projector to project the panoramic image onto a cylindrical surface to generate a final panoramic video image to be used to implement a VR environment on a VR apparatus.

25 Claims, 31 Drawing Sheets

(51) Int. Cl.
*G06T 15/08* (2011.01)
*G06T 19/00* (2011.01)

(56) References Cited

U.S. PATENT DOCUMENTS

| | | | |
|---|---|---|---|
| 2008/0024594 A1 | 1/2008 | Ritchey | |
| 2008/0056612 A1* | 3/2008 | Park | G06K 9/36 382/284 |
| 2008/0240612 A1* | 10/2008 | Liang | G06T 7/85 382/284 |
| 2015/0304634 A1 | 10/2015 | Karvounis | |
| 2016/0353090 A1* | 12/2016 | Esteban | H04N 13/221 |
| 2017/0061686 A1* | 3/2017 | Yu | H04N 5/23254 |
| 2017/0154445 A1 | 6/2017 | Maruhashi | |
| 2018/0343372 A1* | 11/2018 | Lee | G06T 1/0007 |

OTHER PUBLICATIONS

PCT Notification of Transmittal of the International Search Report and the Written Opinion of the International Searching Authority, or the Declaration from PCT/US2019/014862, dated May 14, 2019, 11 pages.

\* cited by examiner

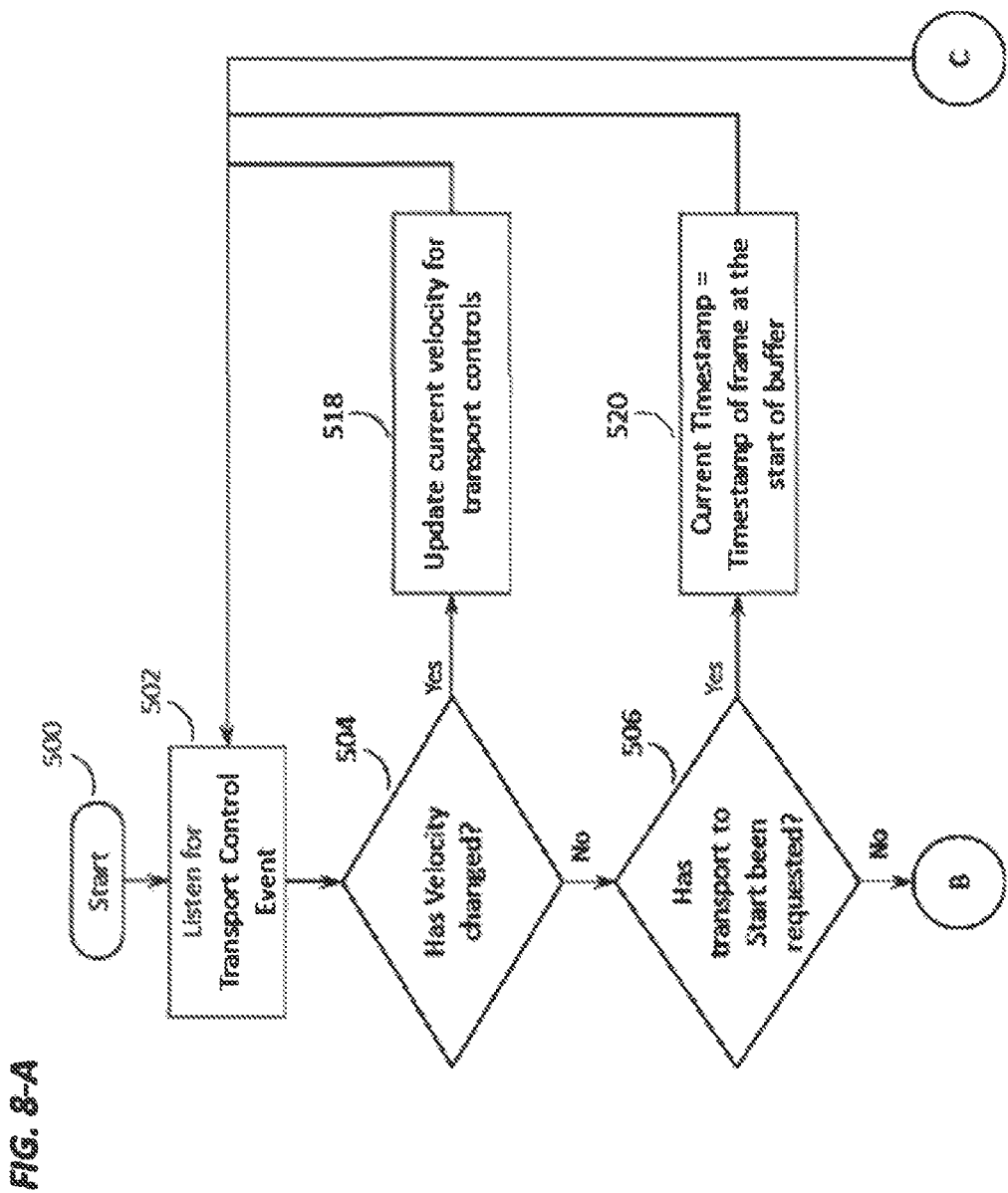
FIG. 8-A

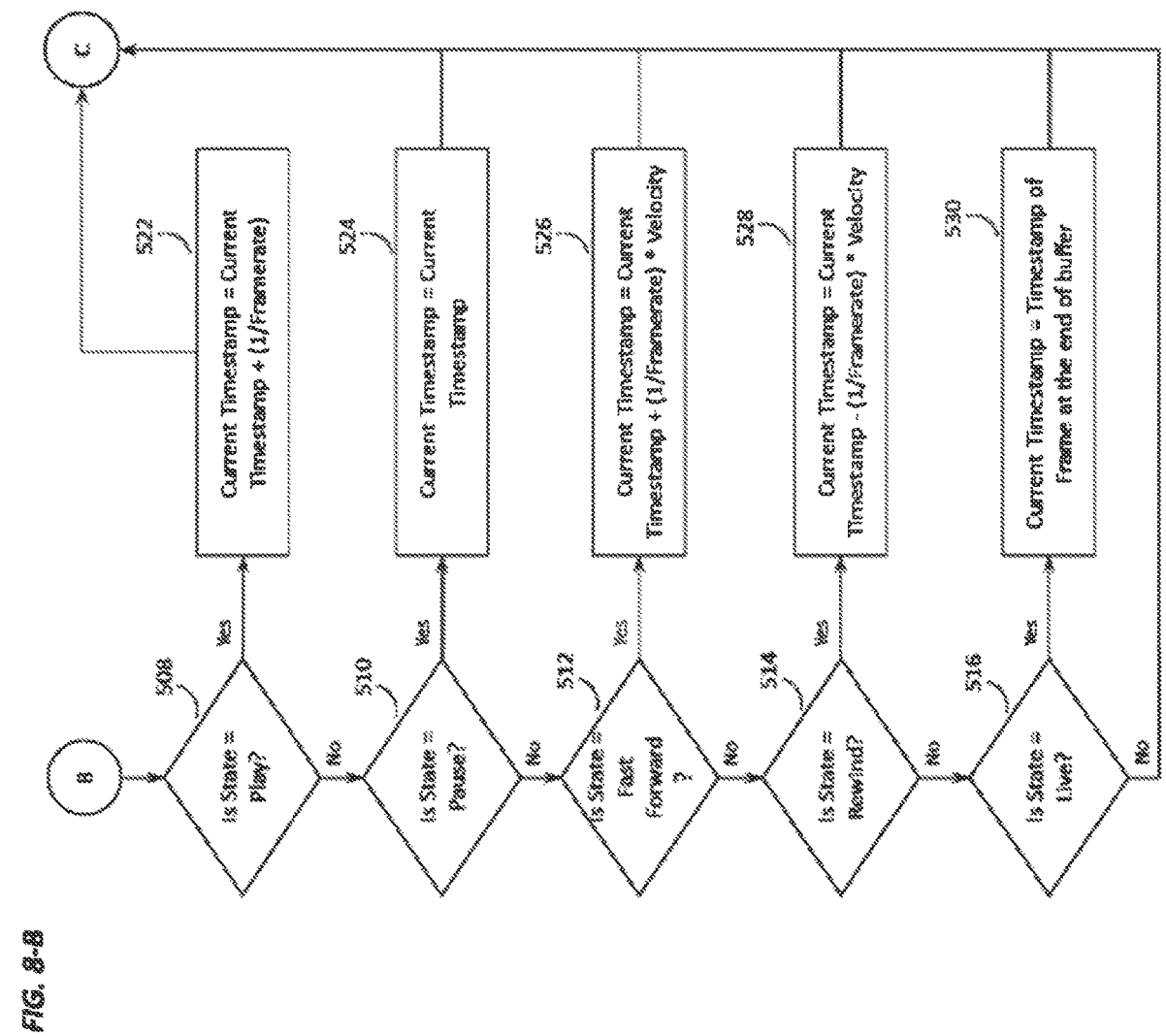
FIG. 8-B

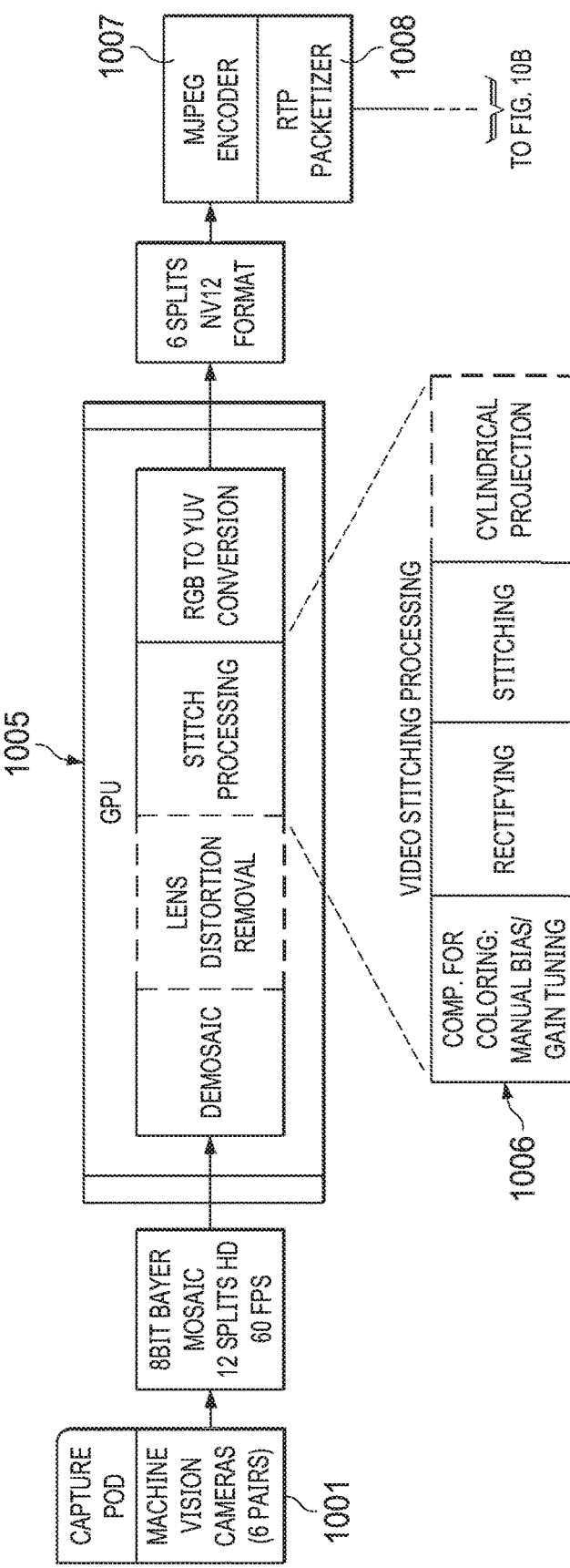

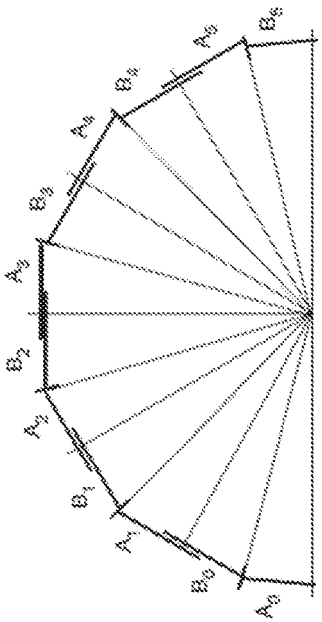
FIG. 12A
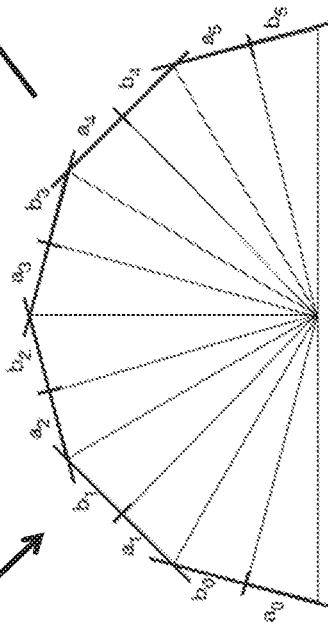
FIG. 12B
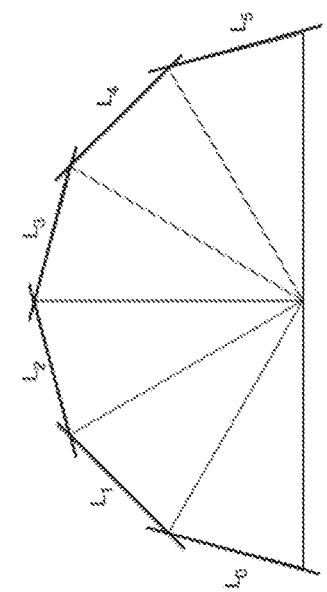
FIG. 12C
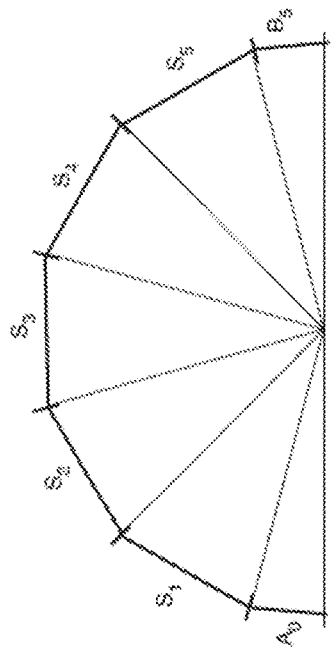
FIG. 12D
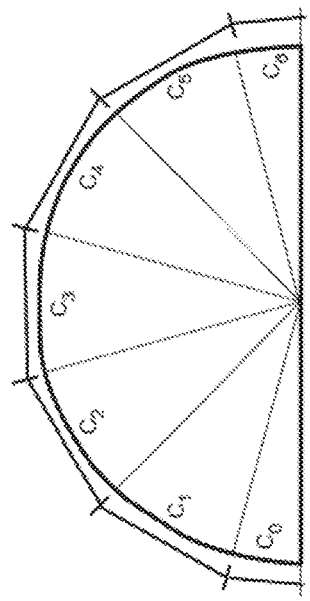
FIG. 12E

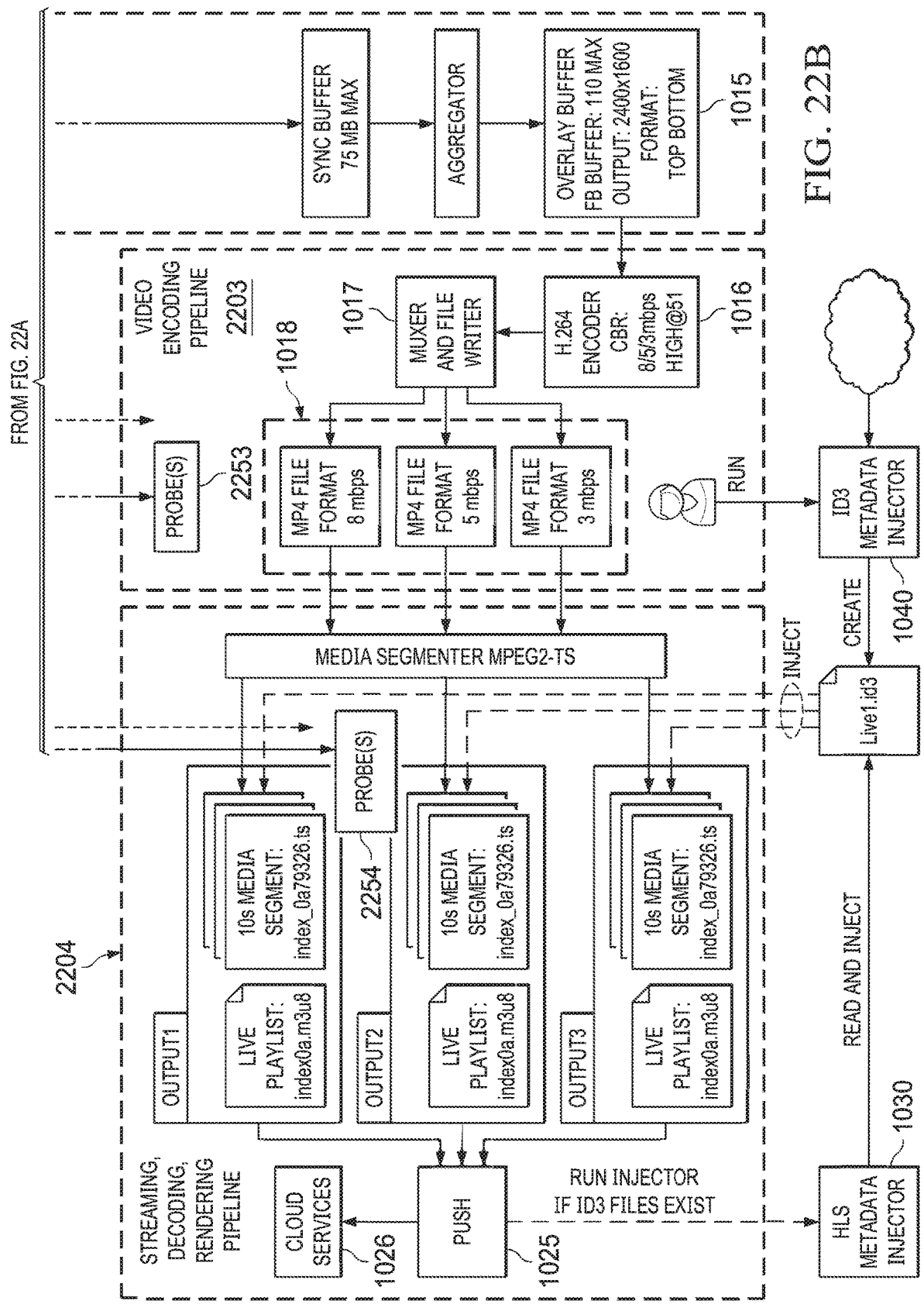

METHOD AND APPARATUS FOR PROCESSING AND DISTRIBUTING LIVE VIRTUAL REALITY CONTENT

CROSS-REFERENCE TO RELATED APPLICATION

This patent application is a U.S. National Phase Application under 35 U.S.C. § 371 of International Application No. PCT/US2019/014862, filed Jan. 24, 2019, entitled METHOD AND APPARATUS FOR PROCESSING AND DISTRIBUTING LIVE VIRTUAL REALITY CONTENT.

BACKGROUND

Field of the Invention

This disclosure pertains to videography, image capture, and playback. More particularly, this disclosure relates to systems and methods for processing and distributing live virtual reality content.

Description of the Related Art

Techniques are known for capturing and viewing panoramic images. Most techniques involve a capture system that captures and processes a series of images to form panoramic images. Sequences of these images form panoramic videos. Techniques for viewing panoramic images typically include a user input method for viewing a portion of the panoramic image on a screen, giving the user a feel of being able to look around in the panoramic image. In addition, techniques are known for transport controls using a buffer of a live video feed. These controls allow a viewer to buffer a live feed on a local device and forward, rewind, pause, and jog through the buffered video.

However, the above known techniques fall short and there is a need to for an apparatus and a method that enables a user to make use of both of the above mentioned capabilities in order to provide a unique viewing experience with multiple panoramic videos.

Current virtual reality (VR) broadcast systems exist, but face a variety of challenges associated with live, panoramic virtual reality (VR) broadcast related to the processing of multiple video streams under strict timing constraints. To generate a panoramic video stream necessary for VR, multiple sequences of adjacent video images captured by a corresponding plurality of video cameras must be stitched together accurately and efficiently. Given the strict timing constraints in a live broadcast VR system, the stitching algorithm must perform a plurality of stitches of adjacent video streams in accordance with the desired framerate. For example, if the desired frame rate is 60 fps, then all of the stitches for one set of frames must be performed within 0.017 seconds.

Another challenge is the amount of bandwidth consumed by the plurality of high definition virtual reality streams across the VR broadcast infrastructure (e.g., servers, network links).

BRIEF DESCRIPTION OF THE DRAWINGS

A better understanding of the present invention can be obtained from the following detailed description in conjunction with the following drawings, in which:

FIG. 3 is a schematic diagram showing how multiple panoramic video feeds can be received at a client by a receiver and user interface that also has controller functionality built in.

FIGS. 8-a and 8-b are two parts of a flowchart showing how the Transport Control Events are handled by the system and how the time stamp for the frame to be displayed to the user is determined based on the Video Playback State of the viewer application.

FIGS. 12A-D illustrate a top view of operations performed to generate a panoramic virtual reality video stream;

FIGS. 27-29 illustrate examples of a scoreboard graphical user interface implemented on embodiments of the invention.

DETAILED DESCRIPTION

This disclosure is submitted in furtherance of the constitutional purposes of the U.S. Patent Laws "to promote the progress of science and useful arts" (Article 1, Section 8).

Embodiments of the present invention disclose an apparatus and method for receiving a video stream from a plurality of Panoramic Video Camera Heads or from a local storage disk, storing the video data in a local memory buffer, and viewing regions of interest within any one of the panoramic videos using user interface devices, while controlling the video time, playback speed, and playback direction globally across all panoramic video data in a synchronous manner. According to one construction, multiple Panoramic Video Camera Heads and are synchronized through a time code generator that triggers the image capture across all camera heads synchronously. According to another construction, multiple camera heads are synchronized by one "Master" camera head that sends trigger signals to all the camera heads. Further, according to yet another construction, each camera head is set to "free-run" with a pre-defined frame rate, and the processing computers all capture the latest frame from each of these cameras and timestamp them with a time code from a time code generator.

Various embodiments herein are described with reference to the figures. However, certain embodiments may be practiced without one or more of these specific details, or in combination with other known methods and configurations. In the following description, numerous specific details are set forth, such as specific configurations and methods, etc., in order to provide a thorough understanding of the present disclosure. In other instances, well-known construction techniques and methods have not been described in particular detail in order to not unnecessarily obscure the present disclosure. Reference throughout this specification to "one embodiment" or "an embodiment" means that a particular feature, configuration, composition, or characteristic described in connection with the embodiment is included in at least one embodiment. Thus, the appearances of the phrase "in one embodiment" or "an embodiment" in various places throughout this specification are not necessarily referring to the same embodiment. Furthermore, the particular features, configurations, compositions, or characteristics may be combined in any suitable manner in one or more embodiments.

As used herein, the term "Transport Control" is understood to mean a user interface that allows a viewer to control the video playback, such as choosing between play, pause, rewind and forward, and the speed of rewind or forward.

Figure 1:
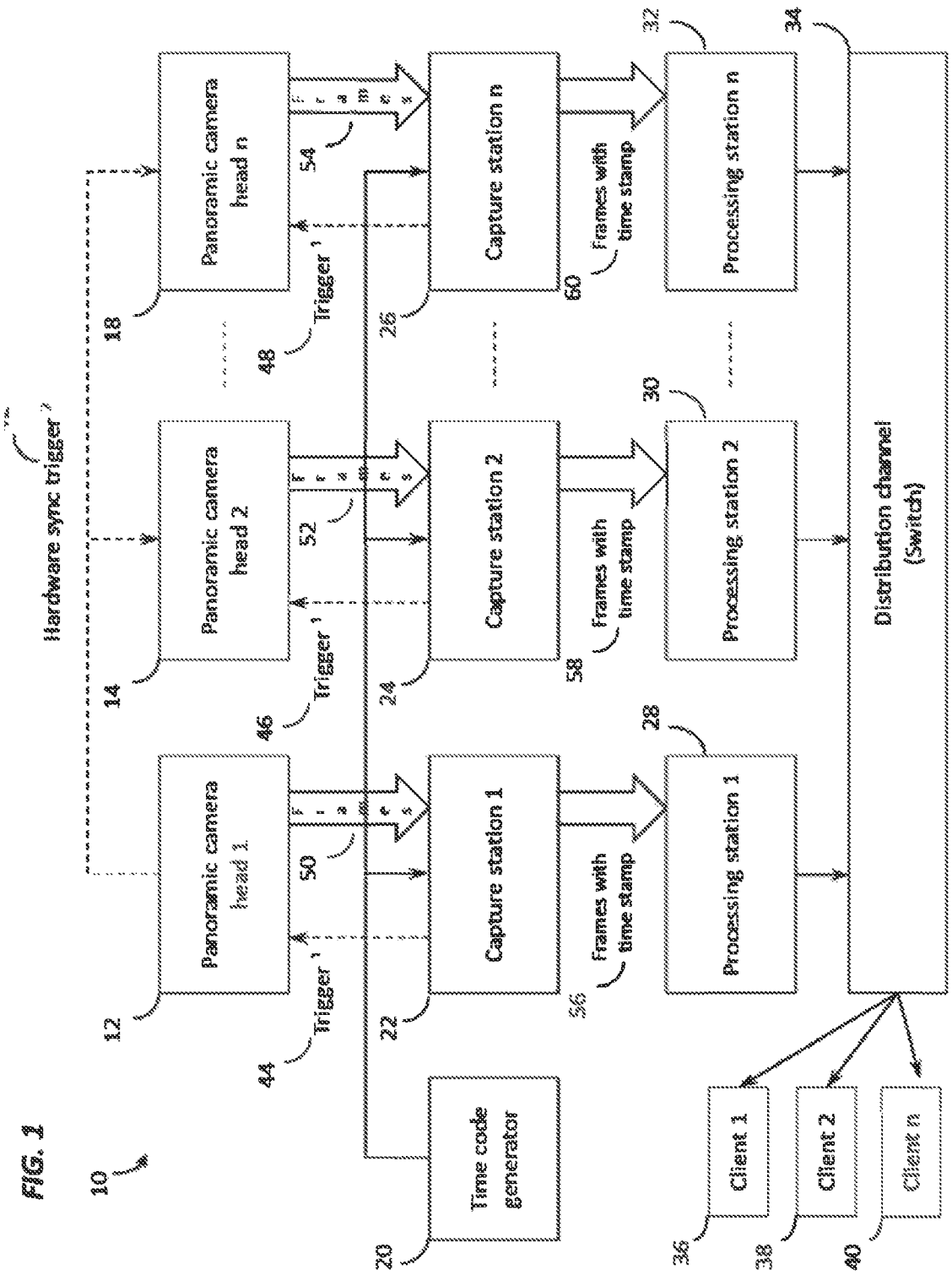
FIG. 1 is a schematic diagram showing unique embodiments of time code synchronization mechanisms that could be used to synchronize frames being captured by capture stations from a plurality of panoramic camera heads before being processed and distributed.

FIG. 1 shows construction of the time code synchronization mechanism 10 extending across a plurality of panoramic camera heads 12, 14 and 18 and capture stations 22, 24 and 25. A time code generator 20 is used to get a consistent time stamp based on the desired rate that frames 50, 52 and 54 need to be captured from the panoramic cameras 12, 14 and 18. The same time code from time code generator 20 is received by each of the Capture Stations 22, 24 and 26, and in one of the embodiments of this mechanism, the time code is used to trigger.sup.1 44, 46 and 48 the panoramic cameras 12, 14 and 18. This is also referred to as a "software trigger" 44, 46 and 48 of the panoramic cameras 12, 14 and 18. The panoramic cameras 12, 14 and 18 capture a frame 50, 52 and 54 when triggered by trigger 44, 46 and 48, respectively, and return the frame 50, 52 and 54 to the corresponding Capture Stations 22, 24 and 26 that generated the trigger 44, 46 and 48. The Capture Stations 22, 24 and 26 attach the time-stamp information from the time code to the frames, forming "frames with time stamps" 56, 58 and 60. Because the time-code is shared between Capture Stations 22, 24 and 26, the frames 56. 58 and 60 generated from each of the Capture Stations 22, 24 and 26 for a given time-code are synchronized, as they have the same time-stamp. These frames 56, 58 and 60 are then transmitted to the Processing Station 28, 30 and 32, respectively, where they are compressed for transmission over the network and sent to some Distribution Channel 34. The time-stamp information on the frames 56, 58 and 60 is maintained throughout this processing, compression, and distribution process. The distribution device, or channel (switch) 34 is configured to distribute the processed images or compressed video stream to client processors in clients 36, 38 and 40. Clients 36, 38 and 40 also include memory.

Another embodiment of the time code synchronization mechanism 10 of FIG. 1 involves triggering the panoramic camera heads 12, 14 and 18 using a "hardware sync trigger.sup.2" 42. The hardware trigger 42 is generated at specific time intervals based on the desired frame rate. This rate of hardware triggering has to match the rate of time codes being generated by the time code generator 20. One of the panoramic camera heads 12, 14 and 18 acts as a "Master" and all other panoramic camera heads 12, 14 and 18 act as "Slaves". The "Master" panoramic camera triggers itself and all the "Slave" panoramic cameras synchronously. When a trigger is generated, a frame is captured at the panoramic camera 50, 52 or 54. Once the frame 50, 52 or 54 is captured, an event is invoked at the Capture Station 22, 24 or 26, and this is when the Capture Station 22, 24 or 26 "grabs" the frame from the camera 12, 14 or 18, and associates the time stamp corresponding to the latest time-code received from the time-code generator 20 to the frame 50, 52 or 54.

A third embodiment of the time code synchronization mechanism 10 of FIG. 1 involves letting the panoramic cameras 12, 14 and 18 capture frames in a "free run" mode, where each of the panoramic cameras 12, 14 and 18 trigger as fast as possible. The Capture Station 22, 24 and 26 uses the time code signal to "grab" the latest frame 50, 52 or 54 that was captured by the panoramic camera 12, 14 or 18, and associates the time stamp corresponding to the time-code with the frame.

Figure 2:
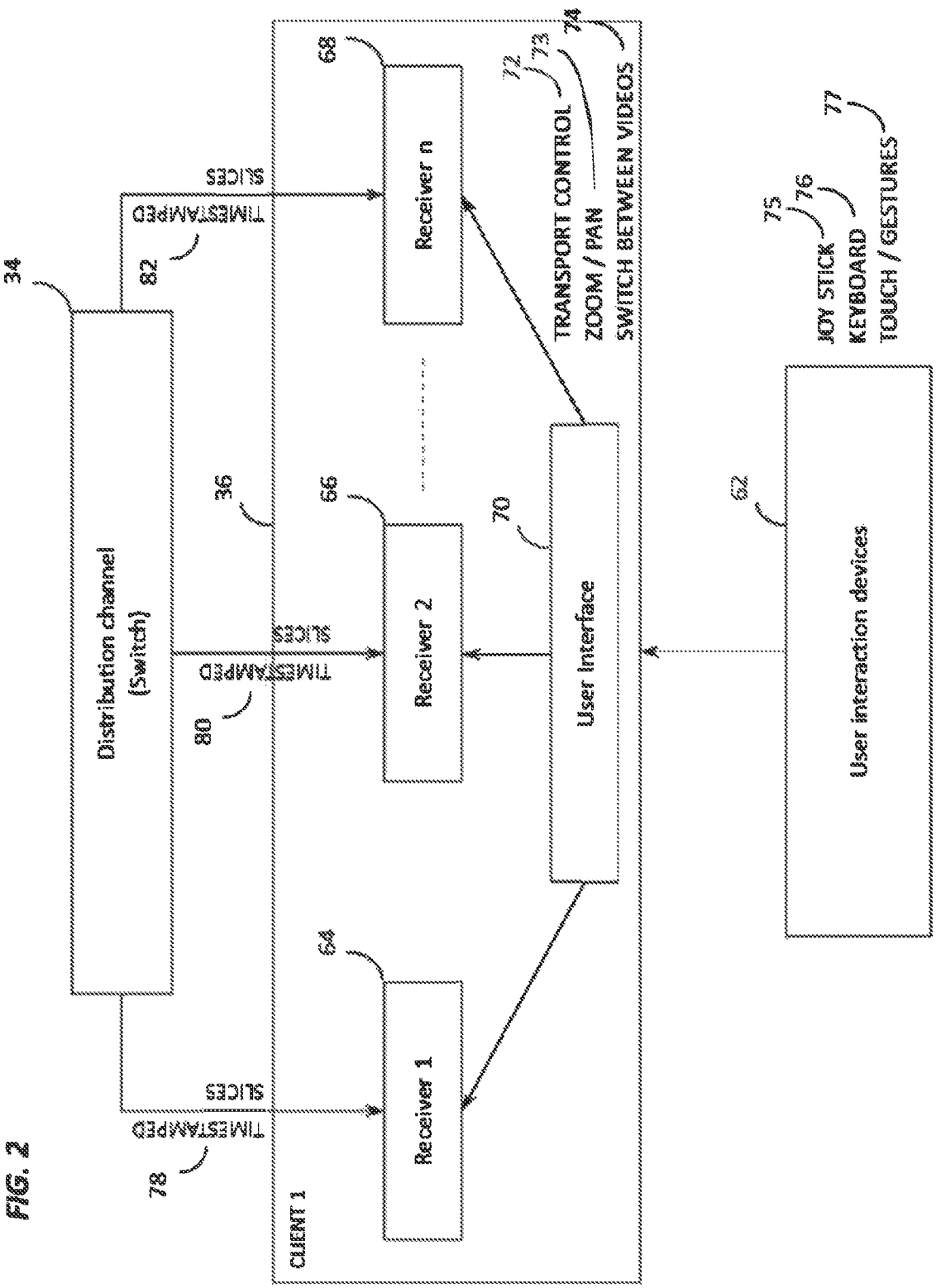
FIG. 2 is a schematic diagram showing how multiple receivers, or receiving modules on a viewer machine would receive time-stamped frames from the panoramic video feeds, and to show the user interface as the intermediate application for managing how the user input requests are handled and how the clients are manipulated to cater to the user request.

FIG. 2 shows multiple receivers 64, 66 and 68 on a client machine 36 receiving time-stamped slices 78, 80 and 82, respectively, from the panoramic video feeds via distribution channel 34. A user interface 70 on the client machine 36 determines which receiver is the active receiver 64, 66 or 68 displayed to the user. User interface 70 also manages the user interaction input from devices 62 like a joystick 75, a keyboard 76, and a touch or gesture based device(s) 77. User interface 70 uses this input to determine which client stream should be the active stream (switch between videos 74), and what section of the panoramic video should be displayed (zoom/tilt/pan 73) to the end-user. Another input from the user-interaction devices is the input related to transport control 72. User interface 70 uses this input and passes it on to all the receivers. This enables all the receivers to perform the same transport control operations to their respective panoramic video streams, and ensures that all the panoramic video streams are synchronized.

Figure 3:
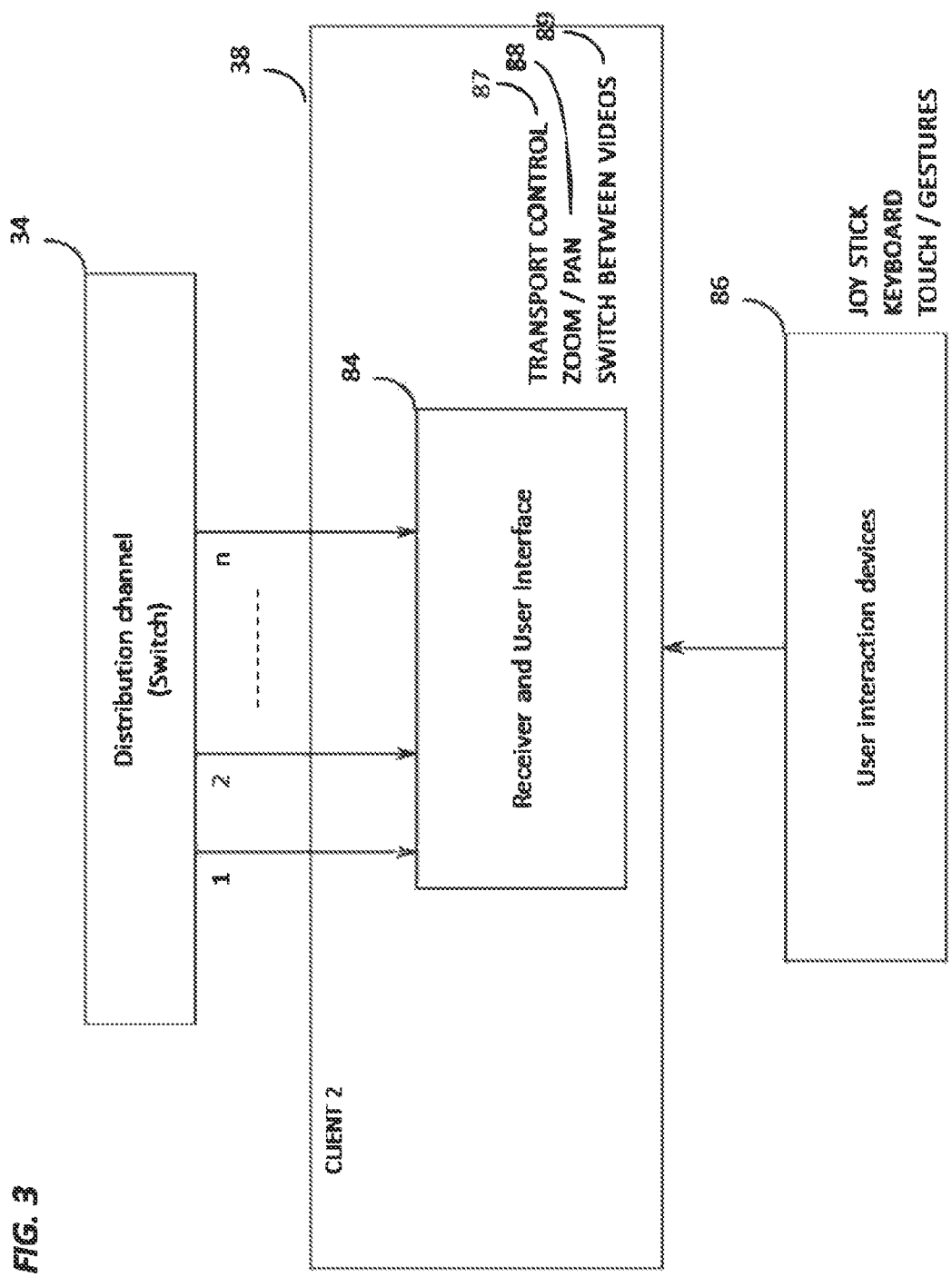

FIG. 3 shows another embodiment of the client application on the viewer machine. In this embodiment, a single application serves as the receiver and user interface 84. The receiver receives time-stamped frames for all the panoramic video streams via distribution channel 34 and manages each of these streams in its own application memory. The receiver also includes processing circuitry. User interface functionality described in FIG. 2 is also integrated in this application. As described in FIG. 2, the user interface manages the input from the user interaction devices 86 and performs the actions for switching between videos 89, what section of the panoramic video should be displayed (zoom/pan/tilt 88) to the end-user, and how to apply the transport control 87 to all the streams in memory.

Figure 4:
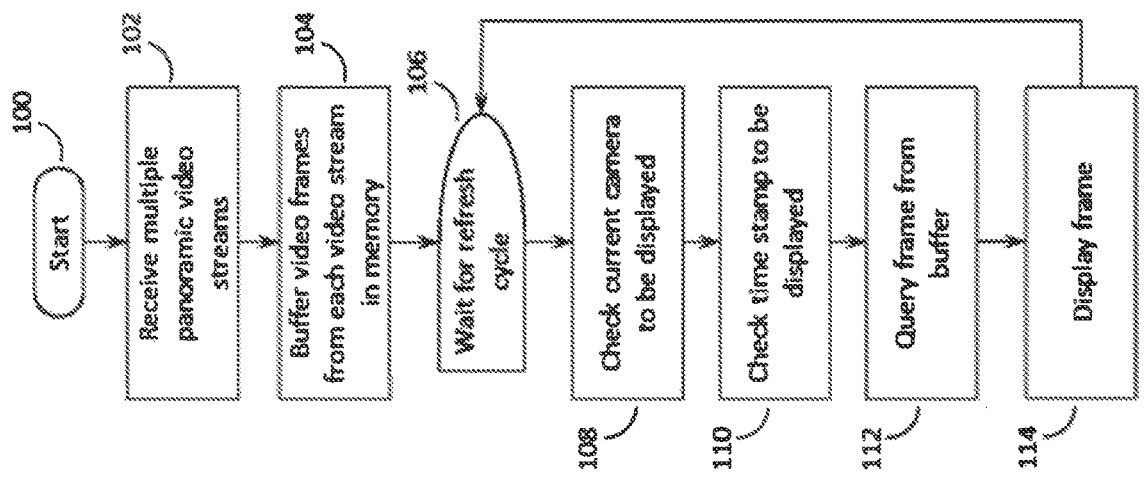
FIG. 4 is a flow chart showing the steps involved in a viewer machine to receive multiple panoramic video streams, to buffer the frames from each feed, and to determine the frame from the buffer to be displayed to the end user based on the camera in view and the time stamp sought by the user.

The following variables are stored with the controller module for receiver and user interface 84 that determine the state of the view that is displayed to the end-user: a. Current Camera to be displayed b. Current Time Stamp of the frame to be displayed c. Current Video Playback State—Possible values are Play, Pause, Fast Forward, Rewind, Live d. Current Viewport—The viewport is determined by the current zoom, pan, and tilt values The user interaction devices 86 could generate the following types of events that are handled by the receiver and user interface 84: a. Camera Changed Event b. Video Playback State Changed Event c. Viewport Changed Event d. Transport Control Event FIG. 4 shows the steps involved in a viewer machine to receive multiple panoramic video streams and determine the frame to be displayed to the end user. The frames from each panoramic video stream that is received by the viewer machine 102 are buffered in memory (Hard disk drive, application memory, or any other form of storage device) 104. Each frame received by the viewer machine has a time-stamp associated with it, which serves as the key to synchronize frames across multiple panoramic streams. Once the frames have started buffering, the viewer application enters a refresh cycle loop starting with a "wait for refresh cycle" 106. The refresh cycle is a periodic set of operations performed by the application at every refresh interval of the display. The viewing application stores the information about the panoramic camera being displayed 108 and the information about the time stamp to be displayed based on the playback state of the application and user inputs related to transport controls. For each refresh cycle, the application checks the current panoramic camera that needs to be displayed, and then checks for the time stamp to be displayed 110. Using these two pieces of information, the appropriate frame to be displayed is sought from the buffer in memory 112. This frame is then passed on to the application for display 114 in that refresh cycle.

Figure 5:
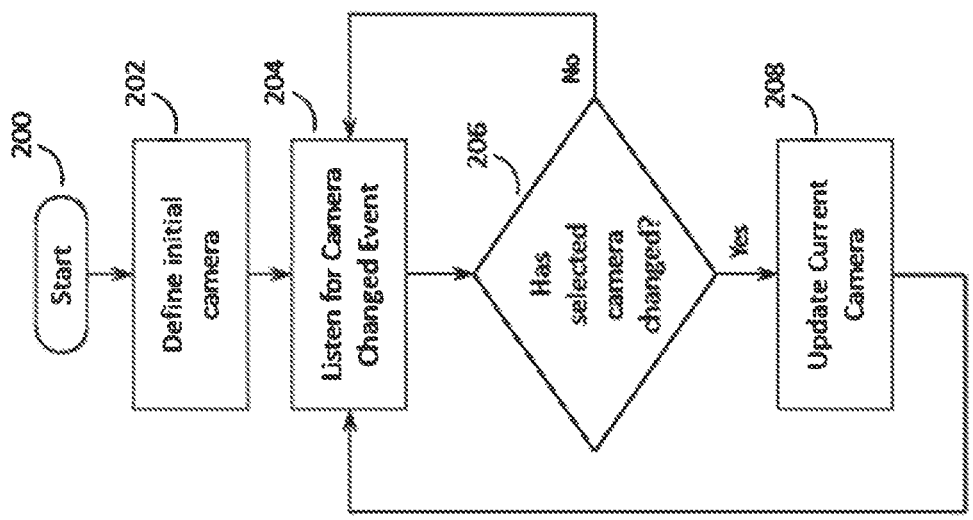
FIG. 5 is a flow chart showing the steps involved in handling a Camera Changed Event triggered by the user.

FIG. 5 shows the steps involved in handling the Camera Changed Event triggered by the user. An initial camera is used, or defined 202 as the default after initiating a start 200. Then the application goes into a 'listen' mode 204 where it is waiting for Camera Changed Events 206 triggered by the user interaction devices. When a request for changing the selected camera is received, the local variable in the application that stores current camera information is updated 208, and the application goes back into the 'listen' mode, waiting for the next Camera Changed Event.

Figure 6:
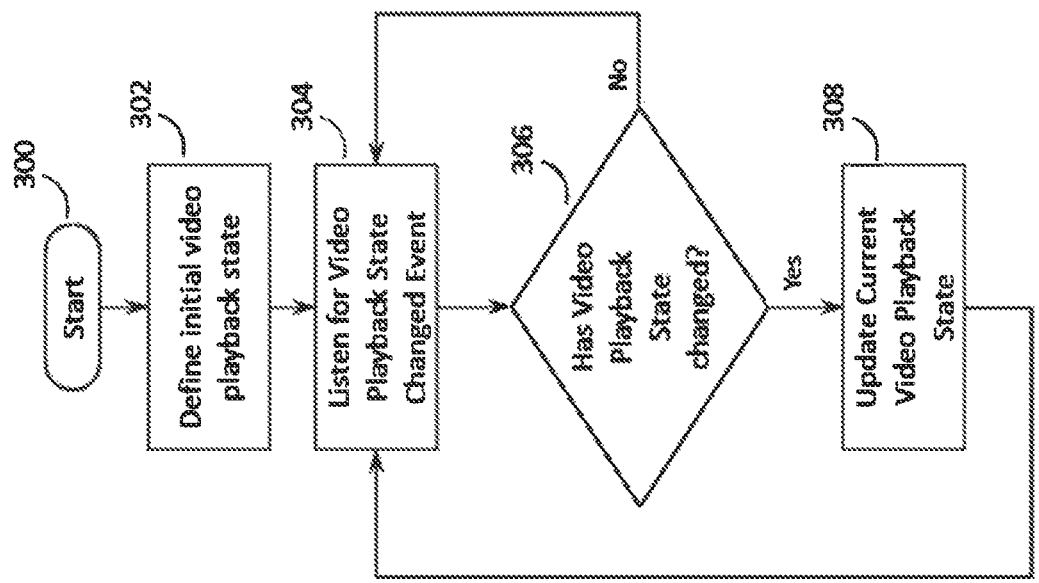
FIG. 6 is a flow chart showing the steps involved in handling a Video Playback State Changed Event triggered by the user.

FIG. 6 shows the steps involved in handling the Video Playback State Changed Event triggered by the user from start 300. An initial video playback state 302 is used as the default to start with. Then the application goes into a 'listen' mode 304 where it is waiting for Video Playback State Changed Events 306 triggered by the user interaction devices. When a request for changing the video playback state is received, the local variable in the application that stores the current video playback state is updated 308, and the application goes back in the 'listen' mode, waiting for the next Video Playback State Changed event.

Figure 7:
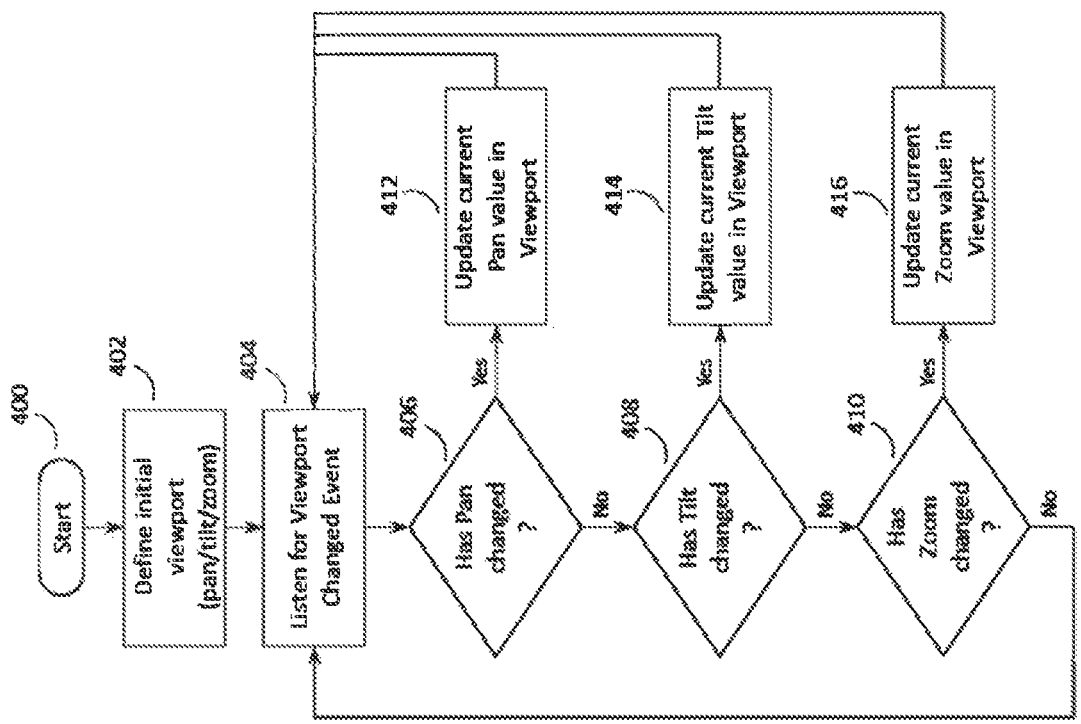
FIG. 7 is a flow chart showing the steps involved in handling a Viewport Changed Event triggered by the user.

FIG. 7 shows the steps involved in handling the Viewport Changed Event triggered by the user from start 400. The viewport could be changed by changing the zoom, tilt, or pan. An initial zoom, tilt, and pan is used as a default 402 to start with. Then the application goes into a 'listen' mode 404 where it is waiting for Viewport Changed Events triggered by the user interaction devices. When a request for changing the viewport is received, the application checks to see if the zoom 410, pan 406, or tilt 408 value has been changes, and updates the local variables 416, 412 and 414, respectively in the application that store the zoom, pan, and tilt. The application then goes back in the 'listen' mode, waiting for the next Viewport Changed Event.

FIGS. 8a and 8b show how the Transport Control Events are handled by the viewing application initiated at start 500. The application is listening for Transport Control Changed Events 502. The application checks to see if the velocity of transport control was changed 504. If the velocity was changed, the value of the velocity stored within the application is updated 518 and the application goes back to listening for Transport Control Changed Events. If velocity has not changed, then the application checks to see if the user has requested to "Transport to Start" 506 so that they view the start of the buffered video stream in memory. If "Transport to Start" was requested, the value of the current timestamp to display is changed to be the same as the timestamp of the frame at the start of the buffer in memory 520, and the application goes back to listening for Transport Control Changed Events. If "Transport to Start" was not requested, then the application determines the current timestamp to be used for display based on playback state that the application is in. If the application is in "Play" state 508, then the current timestamp is incremented to the next timestamp 522. If the application is in the "Pause" state 520, then the current timestamp is not changed 524. If the application is in the "Fast Forward" 512 or "Rewind" state 514, then the current timestamp is incremented 526 or decremented 528 taking the frame rate and velocity of transport into account. If the application is in the "Live" state 516, then the current timestamp is set to the timestamp of the frame at the end of buffered frames in memory 530.

Figure 9:
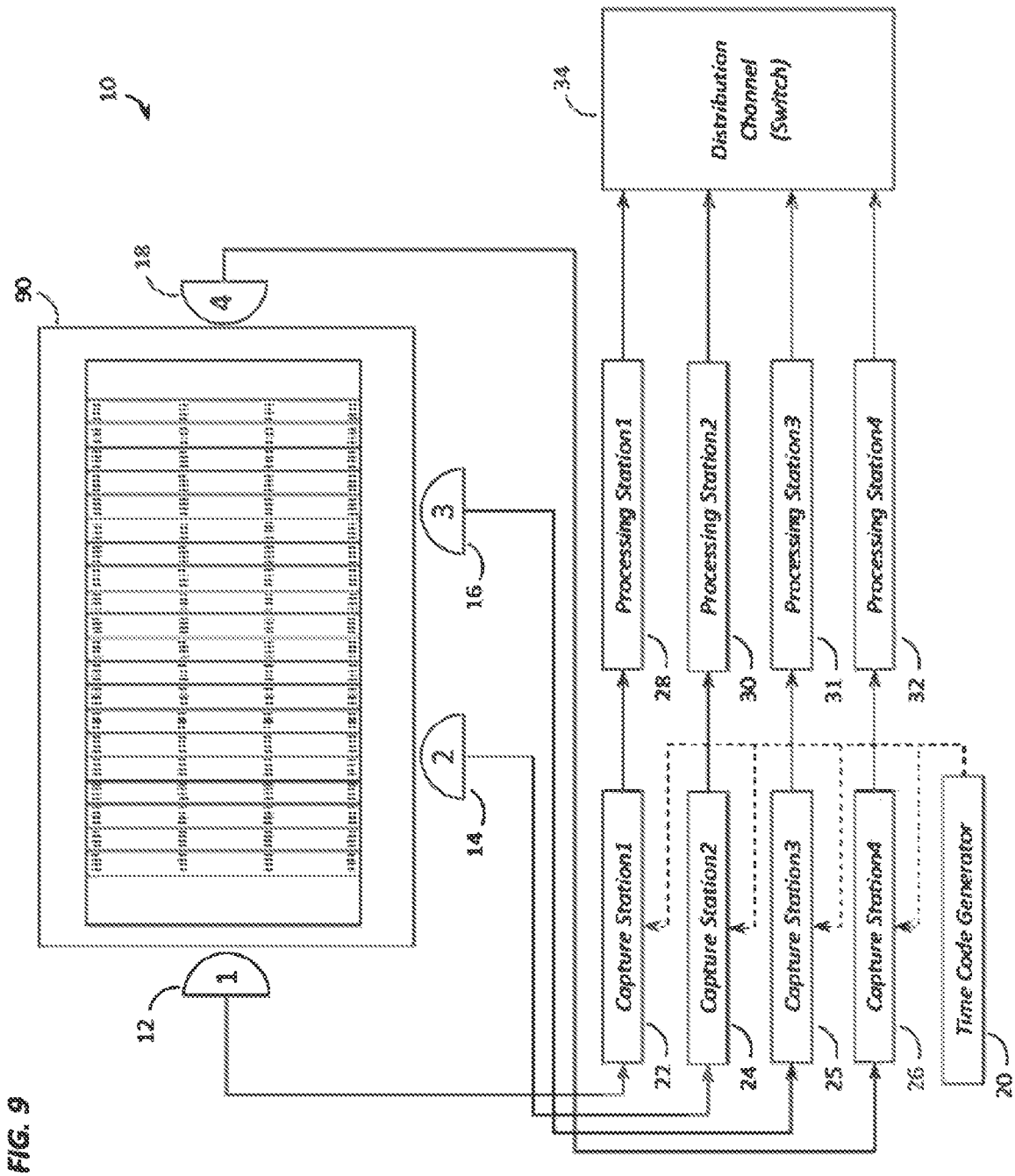
FIG. 9 shows how multiple panoramic cameras are strategically placed an event location and how they are connected to the capture stations, processing stations, and distribution channel.

FIG. 9 shows a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time. Each of the panoramic video cameras 12, 14, 16 and 18 is connected to a capture station 22, 24, 25 and 26, respectively. Each capture station 22, 24, 25 and 26 receives a time-code from a time-code generator, and the time-stamp from the time-code is attached to the frames received from the panoramic video camera. The frames are then transmitted to the processing stations 28, 30, 31 and 32 where they are processed and streamed out to the distribution channel 34. Distribution channel 34 receives the frames and communicates the frames over a network to multiple clients that are connected to the distribution channel.

A panoramic video capture device as used herein comprises multiple sensors placed in a circular array such that a portion of image captured by each sensor overlaps with a portion of image captured by adjacent sensors. The overlapping images from the different sensors are captured synchronously based on a trigger mechanism, and these overlapping images form the basis for creation of a single, seamless panoramic image.

As used herein, a processor is a high-performance server-grade machine housing multiple graphic processing units (GPUs). A GPU is capable of performing large number of operations in parallel. The use of multiple GPUs in the processor allows for highly parallelized computations on multiple image frames being communicated by the panoramic video capture device. Memory can also be resident.

A processor comprises the following modules. First, a capture module is responsible for triggering the panoramic video capture device and retrieving the image frames once the exposure of the frame is complete. In certain embodiments of the capture module, the triggering of the sensors is not performed by this module. There is a separate trigger mechanism for the sensors and the capture module is notified of the event every time a new image frame is available on the panoramic video capture device. When this notification is received by the capture module, it retrieves the image frame from the panoramic video capture device.

As used herein, a processing module is operative to receive the raw frame from the capture module and applies the following filters to the raw frame: Demosaicing filter: In this filter, a full color image is reconstructed using the incomplete color samples from the raw image frames. Coloring filter: The full color image output from the demosaicing filter is then converted to appropriate color space (for example, RGB) for use in downstream modules. Seam blending filter: Colored images output from the coloring filter are used for blending the seam using stitching algorithms on the overlap between adjacent images.

As used herein a splicing module is responsible for using the images output from the processing module, and putting them together with the ends lined up against each other in such that the aggregate of these individual images creates one panoramic image.

Also as used herein, a slicing module takes the seam blended panoramic image, and splits this image into multiple slices. This is done so that each slice of the panoramic image can be distributed over the network in an optimized fashion. This overcomes the existing limitations of certain network protocols that cannot communicate panoramic images above a certain size of the image.

As used herein, a time stamp module listens for the time code from the time code generator. This time stamp is then attached to each slice of the image sections output from the slicing module.

As used herein, a compression module takes the image frame output by the time stamp module and compresses it using certain image compression techniques (JPEG, H.264, etc.) for transmission of over the network.

As used herein, a distribution device is a kind of router or switch that is used for transmitting the compressed frames over the network. Multiple clients could connect to the distribution device and receive the image frames being transmitted. In addition to this, subsequent distribution devices themselves could be connected to a distribution device transmitting the images for relaying the images over a wide network.

As used herein a client process processes the combination of sub-processes and modules on a viewer's machine to receiving image frames from a distribution device, store them in buffer, manage the user input from the user interaction devices, and display the video images to the end-user.

The client process is broken down into the following modules:

A receiving module which connects to the source of the video images via the distribution device, receives the images over the network, and stores them in a buffer on the viewer's machine.

A user interface module is used for managing the user input from the user interaction devices. In one of the implementations of the user interface module, the joystick controller is used for capturing the user input. The user input could be provided using buttons on the joystick or using the multiple thumb pad controls on the joystick. Different buttons are used to track the video playback state change input for play, pause, fast forward, rewind, or live mode A thumb pad control is used to track the viewport change inputs for zoom, pan, tilt of the view Another thumb pad control is used to track the transport control input for jogging forward or back based on the velocity of jog determined by how far the thumb pad control has been pushed.

A display module is used for displaying portion of the panoramic video frames to the user. The portion of the video frame to be displayed is determined based on the inputs from the user interface module. Image frame from the buffer is fetched and based on the other user inputs, the portion of the panoramic image to be displayed is determined. This portion is then displayed to the end-user for viewing.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

Panoramic Broadcast Virtual Reality (VR) Architecture

Figure 10B:
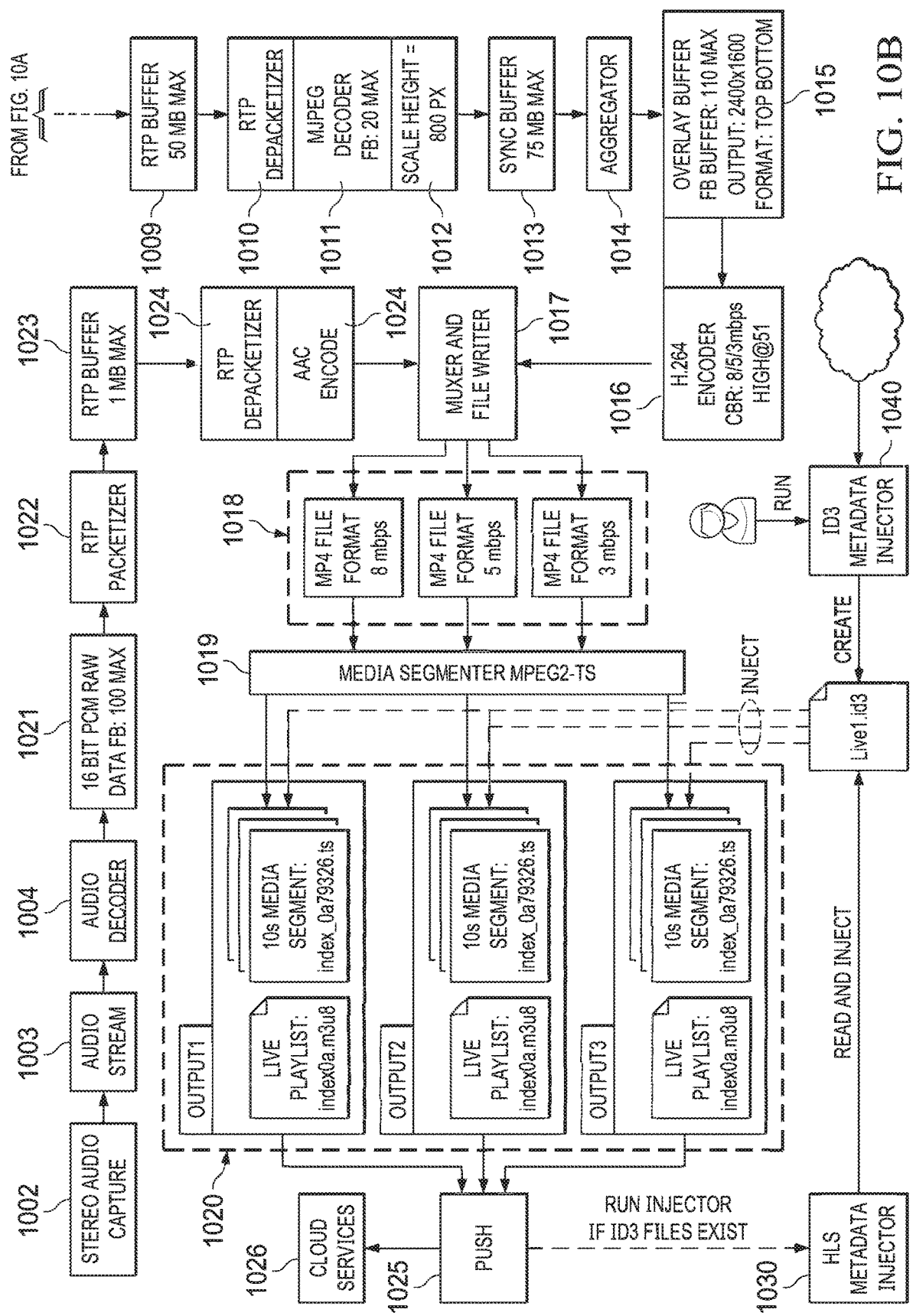
FIG. 10 illustrates one embodiment of an architecture for capturing and streaming real time video of an event.

FIG. 10 illustrates one example of a panoramic broadcast virtual reality (VR) system. As mentioned, in one embodiment, a plurality of stereoscopic cameras 1001 capture video of an event from different perspectives (e.g., a sporting event, musical performance, theatrical performance, etc) and stereo audio capture unit 1002 simultaneously captures and encodes audio 1003 of the event. In one implementation, the six pairs of stereoscopic cameras are integrated on a video capture device 1001 (referred to herein as a capture POD) and any number of such video capture devices 1001 are distributed at different event locations to capture video from different perspectives. As used herein, a stereoscopic camera is typically implemented as two cameras: one to reproduce a left eye perspective and one to reproduce a right eye perspective. As discussed below, however, in certain embodiments (e.g., such as when bandwidth reduction is required) only the left (right) eye video may be captured and the right (left) stream may be reproduced by performing a transformation on the left (right) video stream (i.e., using the coordinate relationship between the left and right eyes of a user as well as the coordinates of the event).

While certain embodiments described herein use six stereoscopic cameras in each device POD, any number of pairs of stereoscopic cameras may be used while still complying with the underlying principles of the invention (e.g., 10 pairs/POD, 12 pairs/POD, etc).

In one embodiment, regardless of how the cameras 1001 are configured, the video stream produced by each capture POD comprises an 8-bit Bayer mosaic at with 12 splits (i.e., 12 different image streams from the 6 pairs of cameras). One or more graphics processing units (GPUs) 1005 then process the video stream in real time as described herein to produce a panoramic VR stream. In the illustrated embodiment, the GPU 1005 performs various image processing functions including, but not limited to, de-mosaic operations, cropping to remove redundant portions of adjacent video streams, lens distortion reduction, color adjustments, and image rotations.

Figure 11:
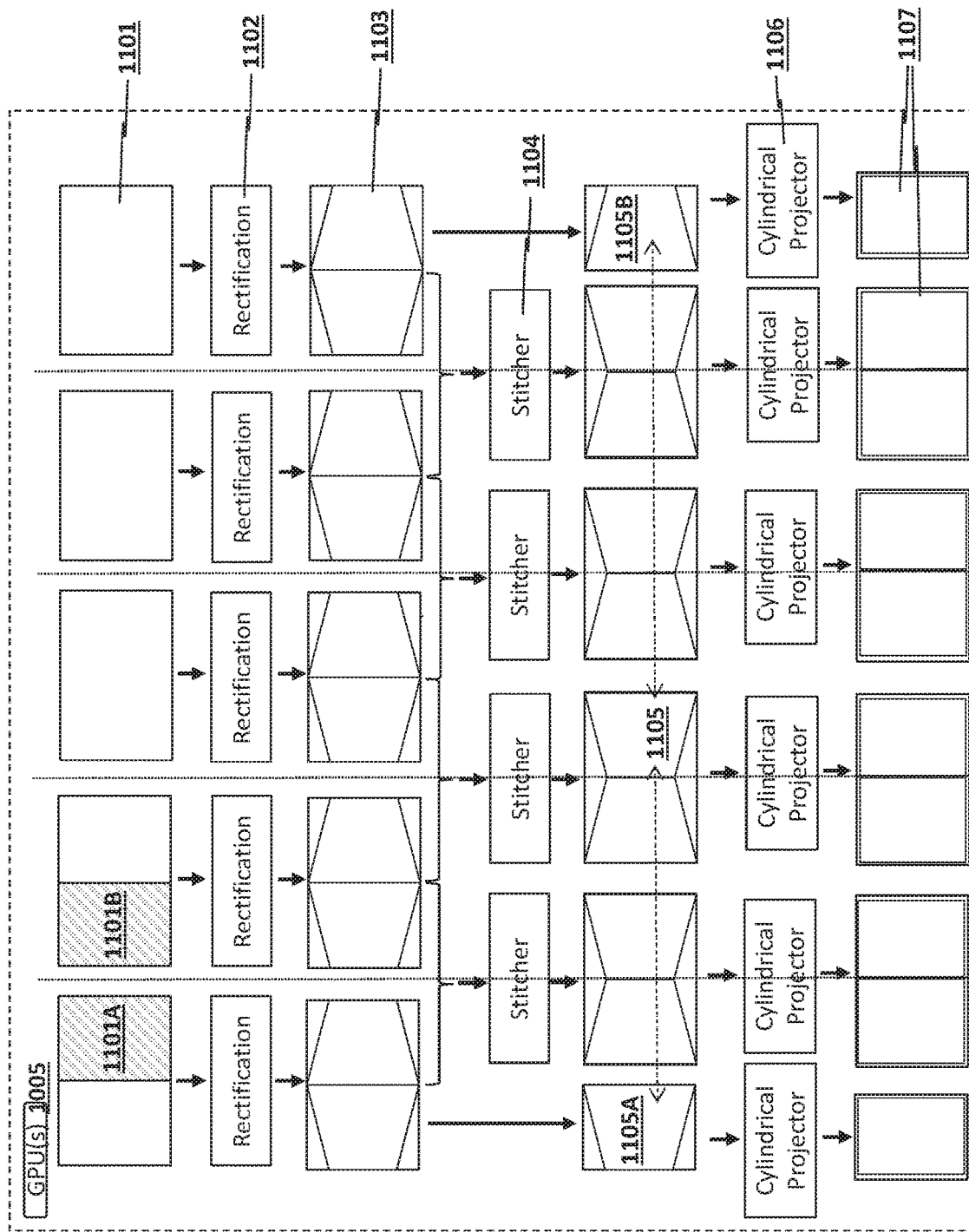
FIG. 11 illustrates one embodiment which performs stitching using rectification followed by cylindrical projection.

Following image processing, the GPU 1005 performs stitch processing 1006 on adjacent image frames to form a stitched panoramic image. One example of the stitch processing 1006 illustrated in FIG. 11 includes rectification operations 1102, stitching operations 1104, and cylindrical projection operations 1106. In particular, FIG. 11 illustrates a specific implementation of stitching using 5 image streams to generate the panoramic image stream. It is assumed that the 5 illustrated streams are processed for one eye (e.g., the left eye) and that the same set of operations are performed concurrently for the other eye (e.g., the right eye).

The highlighted regions 1101A-B of two of the images in the top row of images 1101 indicates the overlapping portions of each image that will be used to identify the stitch. In one embodiment, the width of these regions is set to some fraction of the overall width of each image (e.g., ¼, ⅓, ½). The selected regions include overlapping video content from adjacent images. In one embodiment, the GPU aligns the left image with the right image by analyzing and matching this content. For example, one implementation performs a 2D comparison of the pixel content in each row of pixels. One or more feature points from a first image region (e.g., 1101A) may be identified and used to identify corresponding feature points in the second image region (e.g., 1101B). In other implementations (some of which are described below) a more complex matching model may be used such as belief propagation.

Image rectification 1102 is performed, projecting the images 1103 onto a common image plane. Following rectification, a stitcher 1104 implemented by the GPU uses the designated regions of adjacent rectified images 1103 to match pixels (in accordance with a specified matching algorithm) and identify the correct orientation and overlap between the rectified images 1103. Once the image overlap/orientation is identified, the stitcher 1104 combines each adjacent image to form a plurality of stitched, rectified images 1105. As illustrated, in this particular implementation there are two ½ image portions 1105A-B remaining at each end of the panoramic video.

A cylindrical projector 1106 then projects the stitched images 1105 onto a virtual cylindrical surface to form a smooth, consistent view for the end user in the final panoramic video image 1107.

The embodiments described above may be implemented in software executed on the GPU(s) 1005, by fixed function circuitry, and/or a combination of software and fixed function circuitry (e.g., with some stages being implemented in hardware and others in software). Although not illustrated in the Figures, the data for each image may be stored in a system memory, a caching subsystem on the GPU(s) 1005, a local GPU memory, and/or a GPU register file.

FIGS. 12A-E illustrate the effects of this sequence of operations on the video images from an elevated perspective (i.e., looking down in a direction parallel to the image planes). In particular, FIG. 12A illustrates six input images $\{L_i\}_{i=0}^{5}$. In one embodiment, correction for lens distortion is performed on the input images at this stage.

In FIG. 12B, each image is split in half vertically (ai, bi)=split (Li) and in FIG. 12C, each pair $(b_i, a_{i+1})_{i=0}^{4}$ is rectified by a "virtual rotation" about each view's y-axis (which is equivalent to a homography operation). The two end portions $A_0$ and $B_0$ are also rotated but are not involved in stitching. The following code specifies the operations of one embodiment:

for i=0 . . . 4
$B_i$=rectify($b_i$, α, left) (α is determine empirically)
$A_{i+1}$=rectify($a_i$+1, α, right)
$A_0$=rectify($a_0$, α, right)
$B_5$=rectify ($b_5$, α, left)

FIG. 12D shows stitching of rectified pairs $S_{i+1}$=stitch($B_i$, $A_{i+1}$)$_{i=0}^{4}$ in accordance with one embodiment. Note that this creates a "crease" at the original image centers, but numerically it is sufficiently precise to not create a "seam." In one embodiment, these creases are removed by the cylindrical projection in the next operation (FIG. 12E). In contrast, prior stitching pipelines generated creases at the stitch which resulted in undesirable distortion and a lower quality stitch.

As illustrated in FIG. 12E, a full cylindrical projection is performed for the five stitched images and "half" cylinder projections for the two end images. This is shown as image frames $S_1$-$S_5$ being curved around the virtual cylinder to form $C_1$-$C_5$ and end image frames $A_0$ and $B_5$ being similarly curved to form $C_0$ and $C_6$, respectively. The seven resulting images are concatenated together to form the final panoramic image, which is then processed by the remaining stages of the pipeline.

Figure 13:
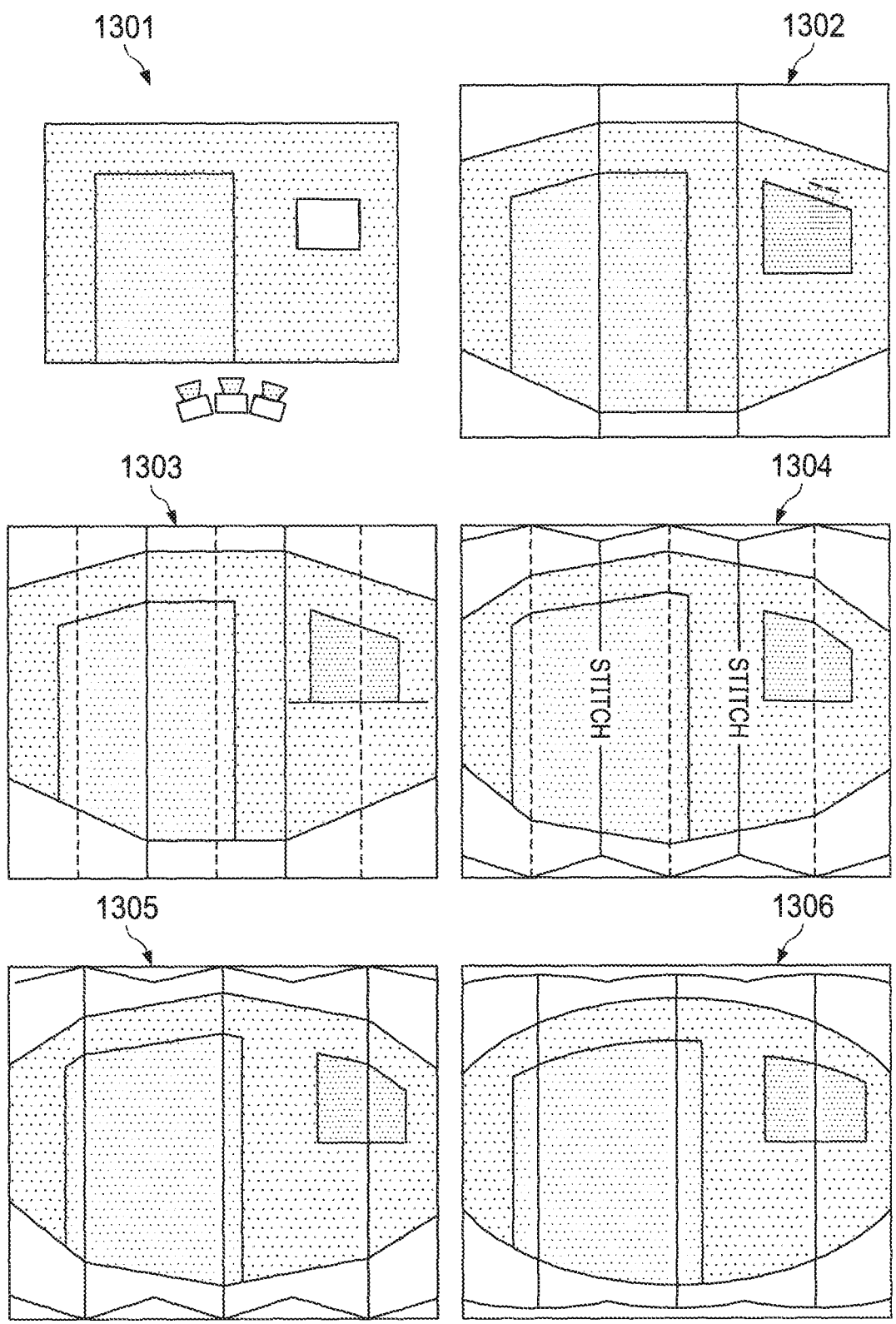
FIG. 13 illustrates a front view of a subset of the operations performed to generate a panoramic virtual reality video stream.

FIG. 13 illustrates another perspective using a simplified set of images 1301-1306 (i.e., captured with three cameras). Image 1301 shows the arrangement of cameras used to capture the video frames shown in image 1302 (overlap not shown). Each image is split vertically in image 1303. In image 1304, each image is transformed using a homography transformation which is a perspective re-projection that effectively rotates neighboring image planes so that they are parallel (see, e.g., FIG. 12C). This rectifies the images fed to the stitcher so that common features are aligned along the same image rows, which is an important operation for fast and accurate stitching.

In image 1305, neighboring images are stitched along their overlapping regions. Note that the homography results in "folds" along the original image center lines. Finally, image 1306 shows a cylindrical projection which is used to create the final panorama Returning to the overall architecture shown in FIG. 10, following rectification, stitching, and cylindrical projection, the GPU 1005 performs RGB to YUV conversion to generate 6 splits (see, e.g., 1107 in FIG. 11). In one embodiment, an NV12 format is used, although the underlying principles of the invention are not limited to any particular format. In the illustrated implementation, a motion JPEG encoder 1007 encodes the image frames 1107 using motion JPEG (i.e., independently encoding each image frame without inter-frame data as used by other video compression algorithms such as MPEG-2).

The encoded/compressed video frames generated by the MJPEG encoder 1007 are packetized by Real-Time Transport Protocol (RTP) packetizer 1008 and stored in a buffer 1009 prior to being transmitted over a network/communication link to RTP depacketizer 1010. While RTP is used to communicate the encoded/compressed video frames in this embodiment, the underlying principles of the invention are not limited to any particular communication protocol.

The depacketized video frames are individually decoded by MJPEG decoder 1011 and scaled 1012 based on desired scaling specifications (e.g., to a height of 800 pixels in one embodiment). The scaled results are temporarily stored in a synchronization buffer 1013. An aggregator 1014 combines multiple video streams, potentially from different capture PODs 1001 and stores the combined streams in a temporary storage 1015 (e.g., such as the overlay buffer described herein).

In one embodiment, an H.264 encoder 1016 encodes the video streams for transmission to end users and a muxer & file writer 1017 generates video files 1018 (e.g., in an MP4 file format) at different compression ratios and/or bitrates. The muxer & file writer 1017 combines the H.264 encoded video with the audio, which is captured and processed in parallel as described directly below.

Returning to the audio processing pipeline, the stereo audio capture unit 1002 captures an audio stream 1003 simultaneously with the video capture techniques described herein. In one embodiment, the stereo audio capture unit 1002 comprises one or more microphones, analog-to-digital converters, and audio compression units to compress the raw audio to generate the audio stream 1003 (e.g., using AAC, MP3 or other audio compression techniques). An audio decoder 1004 decodes the audio stream to a 16-bit PCM format 1021, although various other formats may also be used. An RTP packetizer generates RTP packets in an RTP buffer 1023 for transmission over a communication link/network. At the receiving end, an RTP depacketizer 1024 extracts the PCM audio data from the RTP packets and an AAC encoder 1024 encodes/compresses the PCM audio in accordance with the AAC audio protocol (although other encoding formats may be used).

A media segmenter 1019 temporally subdivides the different audio/video files into segments of a specified duration (e.g., 5 seconds, 10 seconds, 15 seconds, etc) and generates index values for each of the segments. In the illustrated embodiment, a separate set of media segments 1020 are generated for each audio/video file 1018. Once generated, the index values may be used to access the media segments by clients. For example, a user may connect to the real time VR streaming service and be redirected to a particular URL pointing to a particular set of media segments 1020. In one embodiment, the network characteristics of the client's network connection may initially be evaluated to determine an appropriate set of media segments encoded at an appropriate bitrate.

As illustrated one or more metadata injectors 1030, 1040 insert/inject various forms of metadata to the media segments 1020. By way of example, and not limitation, the metadata may include the current scoring and other relevant data associated with the sporting event (e.g., player statistics, rankings, current score, time remaining, etc), information related to the musical performance (e.g., song titles, lyrics, authors, etc), and any other information related to the event. In a sporting implementation, for example, the scoring data and other relevant data may be displayed within a graphical user interface of the VR client and/or integrated directly within the panoramic video stream (e.g., displayed over the actual scoreboard at the event). Moreover, various types of metadata may be injected including HTTP Live Streaming (HLS) metadata injected by an HLS metadata injector 1030 and ID3 metadata injected by the ID3 metadata injector 1040.

In one embodiment, a push unit 1025 dynamically pushes out the various media segments 1020 to one or more cloud services 1026 from which they may be streamed by the VR clients. By way of example, and not limitation, the cloud services 1026 may include the Amazon Web Services (AWS) CloudFront Web Distribution platform. The pushing of media segments may be done in addition to or instead of providing the media segments 1020 directly to the VR clients via the VR service provider's network.

Figure 14:
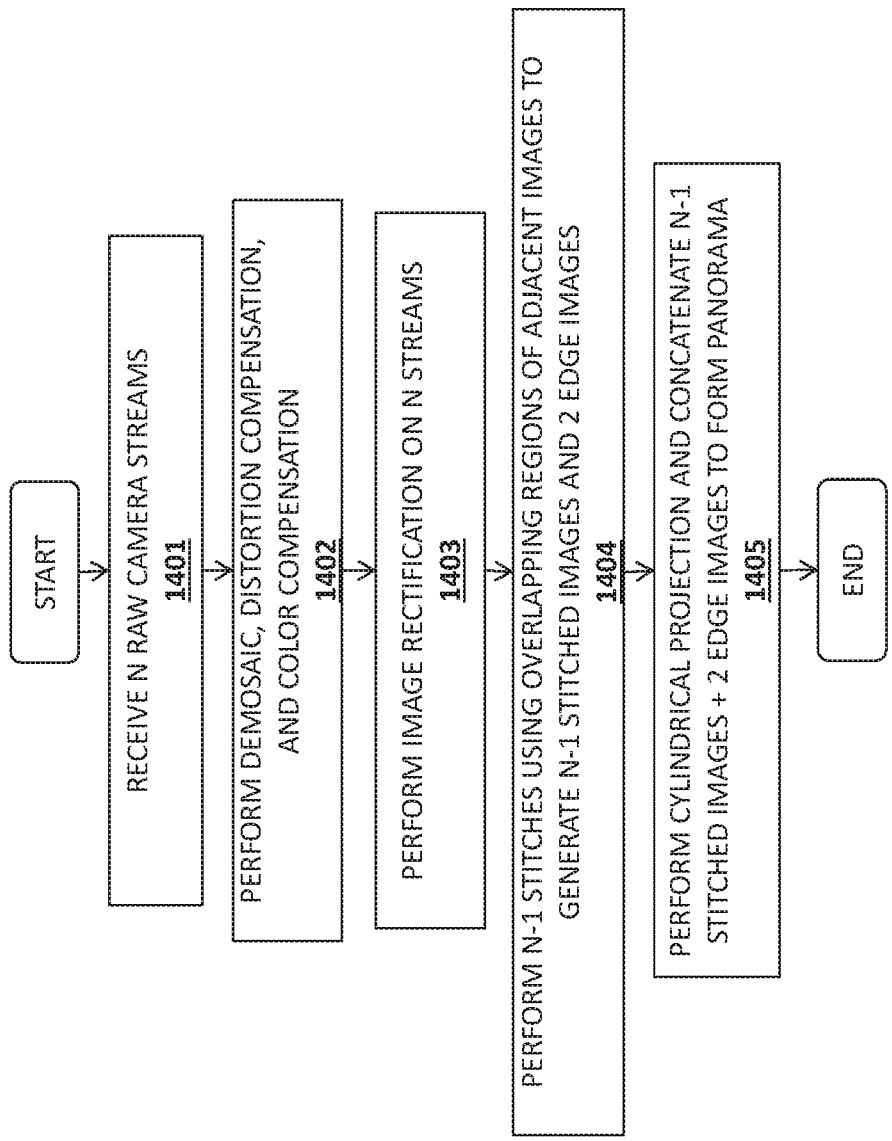
FIG. 14 illustrates a method in accordance with one embodiment of the invention.

A method for efficiently and accurately stitching video images in accordance with one embodiment of the invention is illustrated in FIG. 14. The method may be implemented within the context of the system architectures described above, but is not limited to any particular system architecture. At 1401, N raw camera streams are received (e.g., for each of the left and right eyes). At 1402, demosaicing is performed to reconstruct a full color image from potentially incomplete color samples received from the cameras. Various other image enhancement techniques may also be employed such as distortion compensation and color compensation.

At 1403, image rectification is performed on the N streams and, at 1404, N−1 overlapping regions of adjacent images are processed by the stitching algorithm to produce N−1 stitched images and 2 edge images. At 1405, cylindrical projection and concatenation are performed on the N−1 stitched images and the two edge images to form the panoramic image.

Stitching Using Belief Propagation

As mentioned, one embodiment of the invention employs belief propagation techniques to perform stitching of adjacent images. Belief propagation (BP) (or "sum-product message passing"), is a technique in which inferences are made on graphical models including Bayesian networks and Markov random fields. The belief propagation engine calculates a marginal distribution for each unobserved node, based on observed nodes.

In the context of image stitching, belief propagation is used to identify a most likely matching pixel in a second frame for each pixel in a first frame. Belief propagation has its own internal parameters which dictate how different variables are to be weighted to identify matching pixels. However, the results using standard internal parameters are not ideal.

To address these limitations, one embodiment of the invention performs modifications to the basic belief propagation parameters to generate significantly improved results. In general, there exists a tension between the accuracy of the pixel match and the smoothness/continuity of the seam. Choosing parameters which are weighted towards accuracy will result in degraded continuity and vice-versa. One embodiment of the invention chooses a set of "ideal" parameters based on the requirements of the application.

Figure 15:
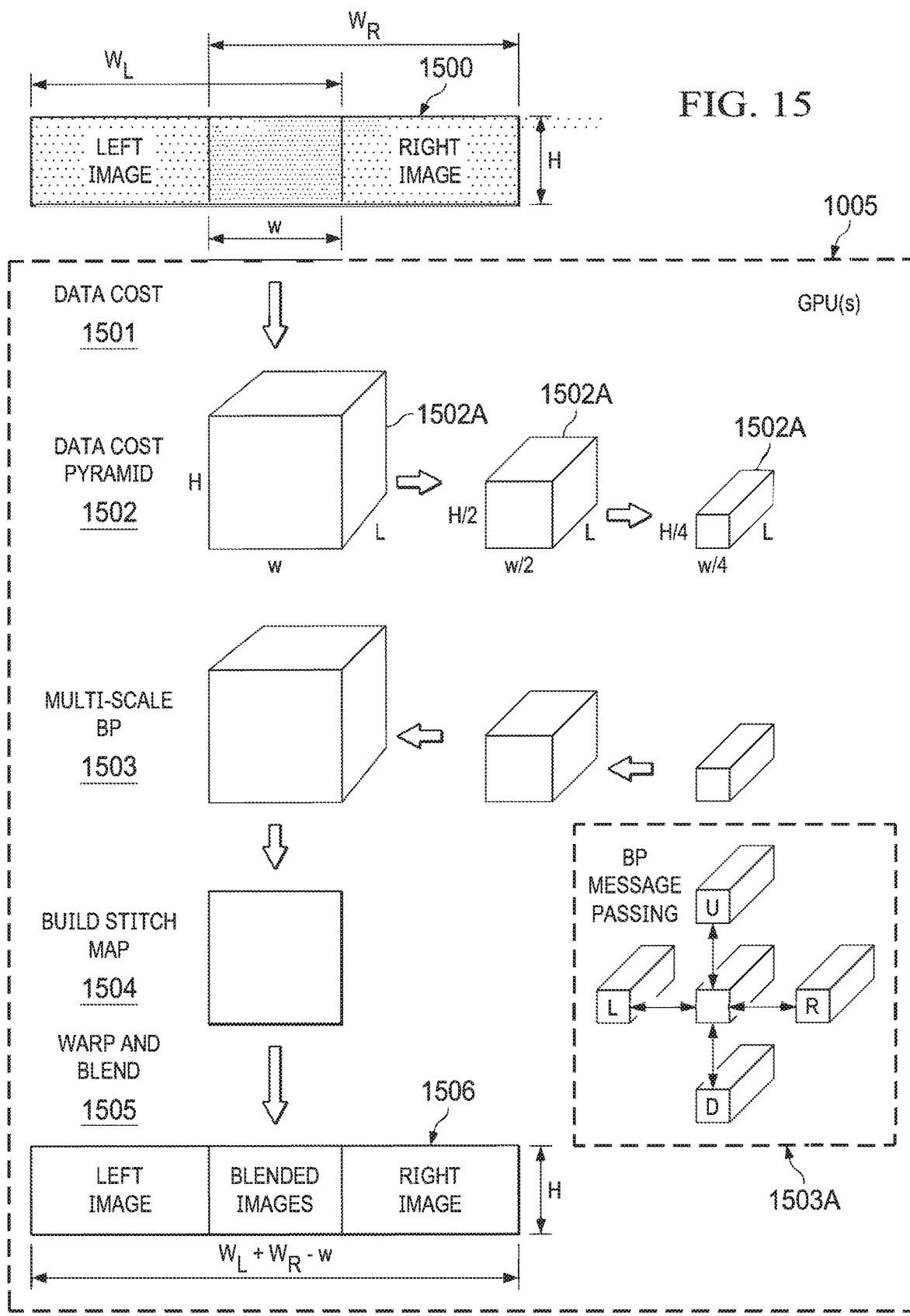
FIG. 15 illustrates one embodiment which performs stitching operations using Belief Propagation.

FIG. 15 illustrates the sequence of operations 1501-1505 performed by one embodiment of the Belief Propagation engine. These operations include initially performing a data cost evaluation 1501 where, for each pixel in the w×H overlapping region between the left and right input image 1500, a cost vector of length L is computed that estimates the initial cost of matching L different candidate pixels between the left and right images.

Each cost value is a real number (e.g., stored as a floating point number). There are many ways to compute this cost such as sum of absolute differences (SAD) or sub of squared differences (SSD). In one embodiment, the result of this computation is a w×H×L "cost volume" of real numbers.

One embodiment finds the index with the lowest cost (i.e., $\text{argmin}_i\ L_i$), but the result at this stage will be too noisy. A "consensus" will be developed between neighboring pixels on what the costs should be. Creating cost values that are more coherent or "cost smoothing" is the one of the primary functions of Belief Propagation.

The cost $L_i$ is converted into a probability $1/e^{Li}$ and normalized. The goal is to minimize the cost (energy minimization) or maximize the probability. Different flavors of Belief Propagation. One embodiment is described in terms of energy minimization, sometimes called the "negative log probability space." One implementation also normalizes the colors to adjust for different brightness and exposures between cameras.

Furthermore, in one embodiment, the number of rows of the images being stitched are down-sampled by a factor (e.g., 2, 3, 4, etc) to speed up the process, thereby reducing the memory footprint and enhancing tolerance for misaligned frames. It is assumed that the images have been rectified so that common features are on the same scan lines (i.e., epipolar lines match and are parallel). Additional image processing may be done at this stage as well such as implementing a high-pass filter to reduce noise from cameras (e.g., charge coupled device (CCD) noise).

Following data cost analysis 1501, a data cost pyramid is constructed at 1502. In one embodiment, starting with the initial data cost volume, a series of smaller volumes 1502A are constructed of size $\{w/2^i \times H/2^i \times L | i=0 \ldots\}$ that make up the data-cost pyramid by averaging/down-sampling cost values. Note that the cost vectors are still of length L for all volumes in the pyramid.

Starting with the smallest volume in the data-cost pyramid, several iterations of Belief Propagation message passing 1503A are performed. The results are then up-sampled to the next largest volume at 1503 and Belief Propagation message passing 1503A is performed again using the up-sampled values as a starting point. For each step four more volumes are created to hold the messages that are passed up, down, left, and right between neighboring cost vectors. Once the iterations are complete, the final costs are computed from the original cost volume and the message volumes. These are used to seed the iteration at the next higher level.

When the final results are generated, a stitch map is constructed at 1504. In one embodiment, the optimal label i is determined for each pixel by computing the "final beliefs" via $i=\text{argmin}_i\ L_i$. These indices i identify which two pixels form the best correspondence between the original left and right images in the overlap region. To speed things up, one embodiment short circuits the multi-scale Belief Propagation process by stopping the iterative process and forming the stitch map from a smaller volume. This results in a smaller stitch map that can be bi-linearly sampled from when stitching. In one embodiment, the stitch map is sorted in a hardware texture map managed by the GPU(s) 1005.

The final image is then stitched by performing warping and blending in accordance with the stitch map 1504 to generate the final stitched image frame 1506. In particular, for each pixel in the overlapping region the stitch map is used to determine which two pixels to blend. One embodiment blends using a convex linear combination of pixels from each image:

result pixel=$(1-t)$*left pixel+$t$*right pixel, where t varies from 0 to 1 when moving from left to right across the overlap region. This blend biases towards left pixels on the left edge and biases towards right pixels on the right edge. Pixels in the middle are formed with a weighted average. Laplacian Blending is used in one embodiment to reduce blurring artifacts.

In one implementation, a completely new stitch is performed for every frame. Given the significant processing resources used to identify the stitch, one embodiment of the invention feeds back the previous stitch parameters for one or a combination of previous frames to be used to stitch the current frame.

Figure 16:
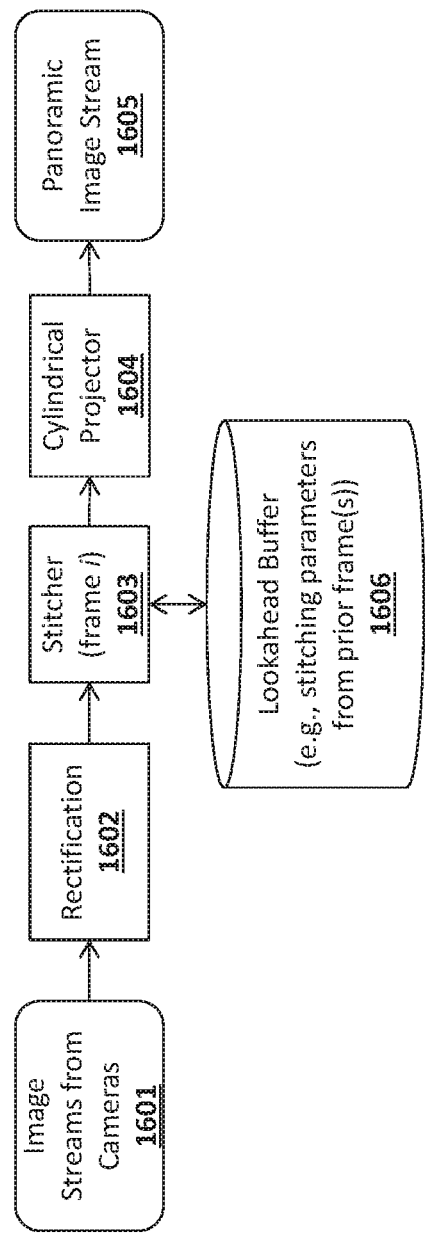
FIG. 16 illustrates a stitching architecture which uses stitching parameters from one or more prior frames to stitch a current frame.

FIG. 16 illustrates one embodiment of an architecture which includes rectification circuitry/logic 1602 for performing rectification of images streams from the cameras 1601 (e.g., of one or more capture PODs) and stitcher circuitry/logic 1603 which stores stitching parameters from prior frames to be used as a starting point. In particular, a lookahead buffer 1606 or other type of storage is used by the stitcher 1603 to store parameters from previous stitches and read those parameters when processing the current set of image frames. For example, the specific location of a set of prior feature points may be stored and used to identify the stitch for the current image frames (or at least as a starting point for the current image frames).

In one embodiment, the parameters from previous stitches may simply be the parameters from the last stitch. In another embodiment a running average of these parameters is maintained (e.g., for the last N stitches). In addition, in an implementation which uses belief propagation, the previously-determined depth map pyramids shown in FIG. 15 may be reused.

In one embodiment, blending between adjacent images is used when a stitch fails. A failed stitch may occur, for example, due to insufficient information, disparate lighting (which may be temporary), and any other circumstances where similarities between pixels cannot be determined.

In response to a failure, one embodiment of the invention analyzes the previous and next scan lines and blends them together. Different types of blending may be selected based on characteristics of the two frames. The blending may include (but is not limited to) linear blending, Laplacian blending, and Gaussian blending. Alternatively, or in addition, when pixels cannot be differentiated, the stitch parameters from one or more prior stitches may be used (as described above).

In one embodiment, the luminance (Y) plane is used to perform stitching operations, excluding the U and V planes, to reduce the amount of data required for stitching. Color does not provide significant value for stitching, unless certain types of operations such as background subtraction are used. Thus, the stitching pipeline is optimized with YUV requiring less memory and less time for conversions.

In one implementation, if two Y values from the two frames are identical or within a specified threshold, the U and the V values may then be evaluated to provide further differentiation between the pixels (e.g., to determine whether they have similar/same colors) thereby providing a more efficient culling mechanism (i.e., to cull candidates which are outside of the threshold).

One embodiment the invention quantifies stitch accuracy, potentially evaluating each seam down to a single number. As the stitch is changed, this embodiment searches for patterns, evaluates the associated numbers and identifies the one with the highest quantity as the stitch. This may be performed for each scan line where the belief propagation algorithm determines the extent to which this is a good stitch (i.e., quantifies the stitch accuracy).

Different types of variables may be evaluated to arrive at the number including data cost (how well left matches right pixel) and smoothness (how well two neighboring pixels agree).

Bandwidth Reduction and Failure Recovery

In circumstances where network bandwidth is severely limited and/or in cases where one of the camera streams is non-functional or occluded, one embodiment reproduces one stream (e.g., which is occluded) using video streams from one or more adjacent cameras. For example, in one embodiment, in response to detecting that a stream from camera N is detected (e.g., the left eye stream in a left/right stereoscopic pair of cameras) one embodiment of the invention performs an image transformation on the stream from adjacent cameras N+1 and/or N−1 to reproduce the camera N stream.

Figure 17:
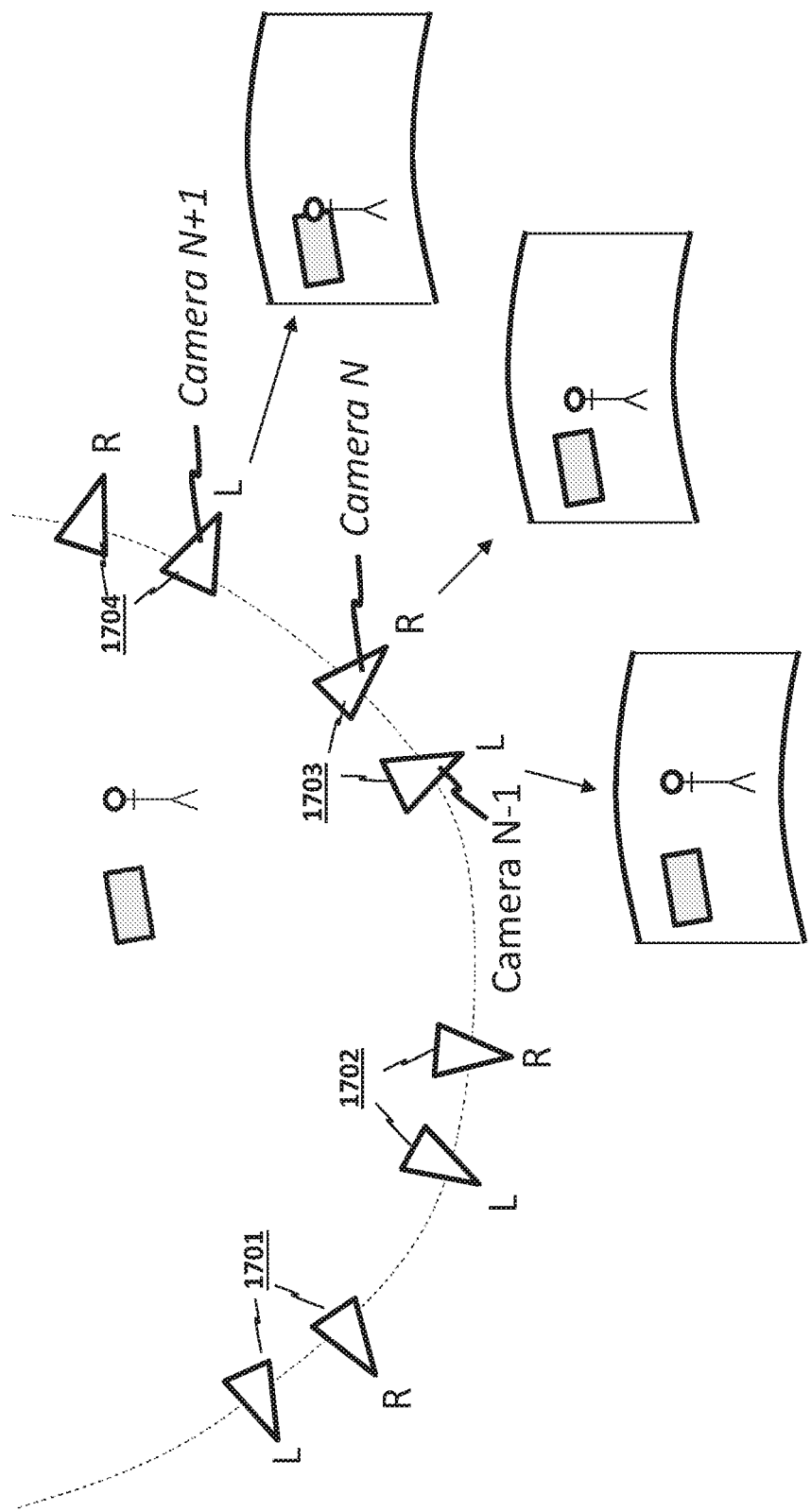
FIG. 17 illustrates one embodiment which performs coordinate transformations to reduce bandwidth and/or storage.

FIG. 17 illustrates an example arrangement in which a plurality of left/right cameras 1701-1704 capture an event from different viewpoints. An image of a stick figure is captured relative to a grey rectangle. These two objects are used to illustrate the manner in which the perspective changes from camera N−1 to camera N+1. For example, in the video stream from camera N−1, there is a larger separation between the two objects while from camera N+1, there is no separation (i.e., the user is occluding a portion of the rectangle).

It can be seen from this arrangement, that there is a significant overlap in the image data captured by cameras N, N+1, and N−1. The embodiments of the invention take advantage of this overlap to reduce bandwidth and/or compensate for the failure or camera N. For example, per-camera transformation matrices may be calculated prior to an event based on the orientation differences between a first camera (e.g., camera N) and one or more adjacent cameras (e.g., camera N+1). If the differences in orientation of the two cameras is known (e.g., X, Y, Z vector defining the 3D direction each camera is pointing, the distance to the event objects from the cameras, etc) then these differences may be used to generate a transformation matrix for camera N which can be used to reconstruct it's video stream.

In one embodiment, two transformation matrices are generated for camera N: one for camera N+1 and one for camera N−1. Using two cameras ensures that all of the necessary video data will be available to reconstruct camera N's video stream. However, in other embodiments, only one video stream from one adjacent camera is used. In this case, the camera selected for the reconstruction should be the corresponding left/right camera. For example, if camera N is a left eye camera, then camera N+1 (used for the transformation) should be the corresponding right eye camera. Choosing the alternate eye camera makes sense given the significant correlation in orientation between the left/right cameras. If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 18:
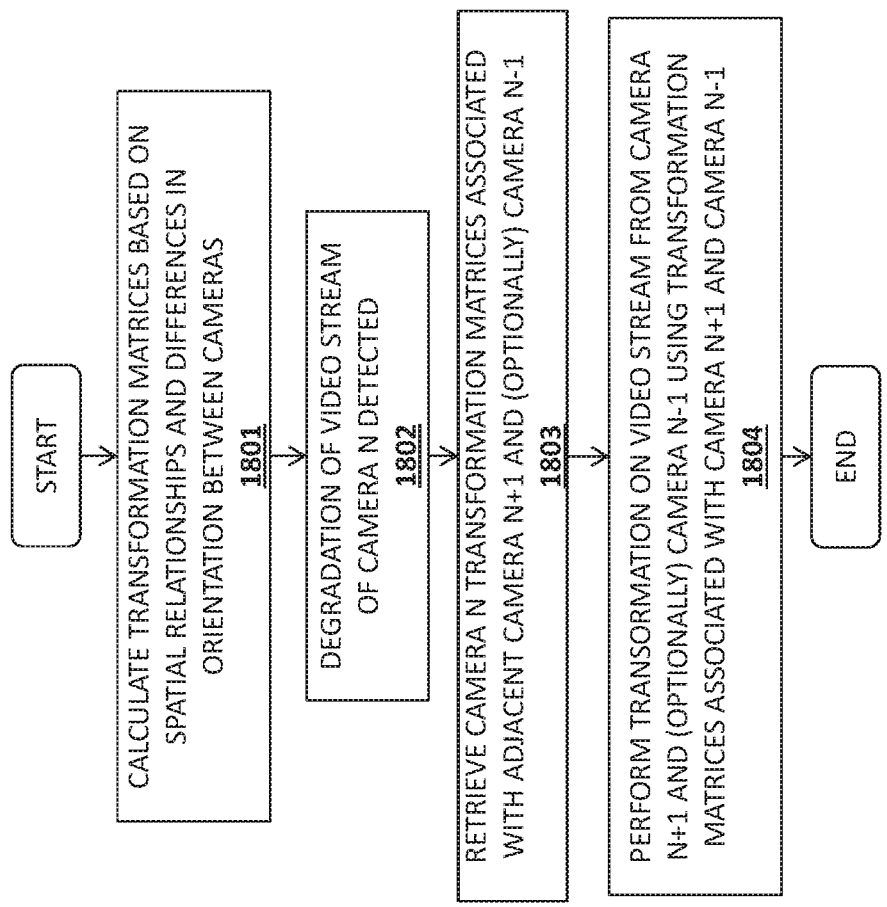
FIG. 18 illustrates a method in accordance with one embodiment of the invention.

A method in accordance with one embodiment of the invention is illustrated in FIG. 18. At 1801, transformation matrices are calculated for each camera, based on spatial relationships and differences in orientation between cameras. At 1802, a degradation of a video stream of camera N is detected. For example, camera N may have failed or may there may be bandwidth issues with the network link.

At 1803, the transformation matrices associated with adjacent cameras N+1 and N−1 are retrieved and, at 1804, a transformation is performed on one or both of the video streams from camera N+1 and camera N−1. For example, the camera N matrix associated with camera N+1 may be used to transform camera N+1's video stream using the transformation matrix to reconstruct the video stream from the perspective of camera N. In one embodiment, the camera selected for the reconstruction is one of the left/right pair. For example, if camera N is a left eye camera, then camera N+1 (used for the transformation) is the corresponding right eye camera. Choosing the alternate eye camera makes sense given the significant correlation in orientation between the left/right cameras.

If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 19:
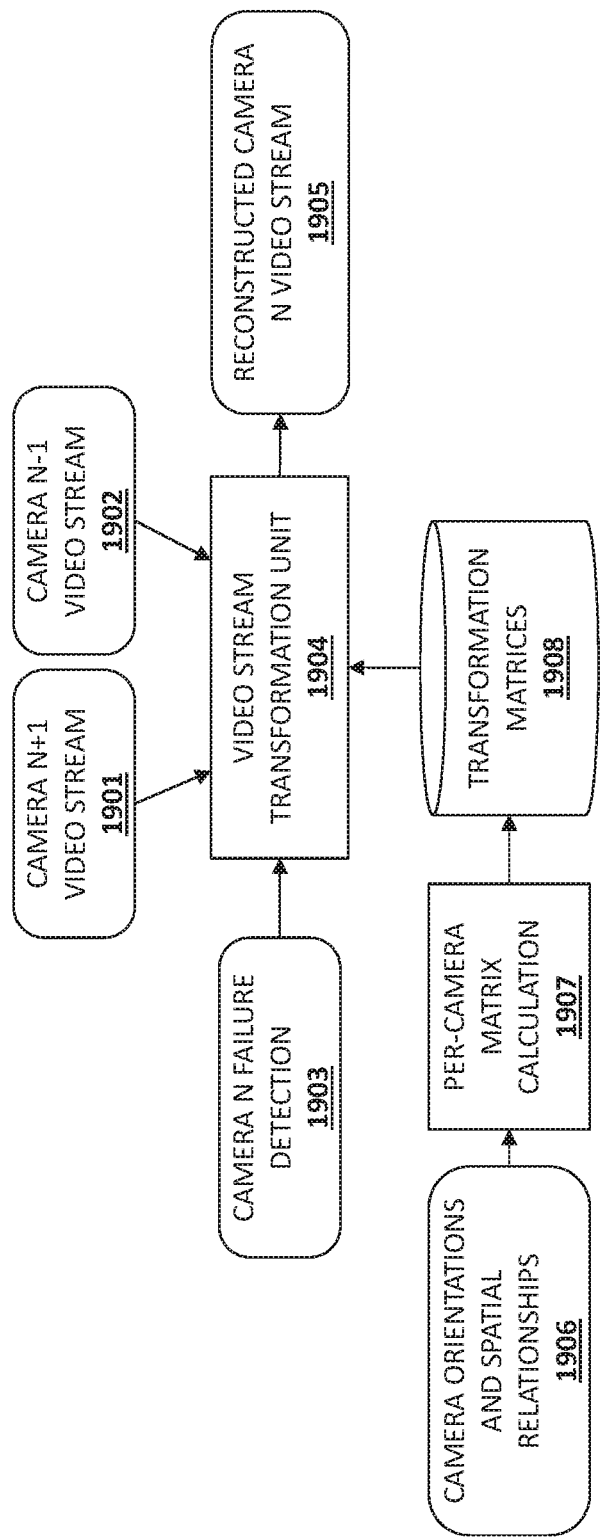
FIG. 19 illustrates an architecture for performing viewing transformations on virtual reality video streams to adjust.

FIG. 19 illustrates an example architecture which includes a per-camera matrix calculation unit 1907 for calculating the various transformation matrices 1908 described herein based on the camera orientations and relative spatial relationships of the cameras 1906 (as described above). In one embodiment, the transformation matrices 1908 are stored for later use.

In response to a failure detection unit 1903 (e.g., a microservices-based monitoring system) detecting a failure of camera N, a video stream transformation unit 1904 reconstructs camera N's video stream based on the video streams of camera N+1 and camera N−1. As mentioned above, the camera N matrix associated with camera N+1 may be used to transform camera N+1's video stream using the transformation matrix to reconstruct the video stream from the perspective of camera N. If there are portions of the image which cannot be reconstructed, these portions may be identified in the video stream from camera N−1. The camera N matrix associated with camera N−1 may be used to fill in any holes in the transformation performed on the video stream from camera N+1.

The techniques described here may be used for a variety of circumstances including, but not limited to insufficient bandwidth, occlusion by objects, and/or equipment failures. While the embodiments described above focus on a camera failure, one embodiment performs the techniques described herein for the sole purpose of reducing bandwidth.

In addition, in one embodiment, the techniques described above are used for efficiently storing video streams of an event for later playback (e.g., after the event has ended). The amount of mass storage space consumed by 6-12 5k video streams is significant. Moreover, in one implementation, capture PODs capture video using motion JPEG (see, e.g., FIG. 10, and MJPEG encoder 1007) which consumes significant bandwidth and storage space.

To reduce bandwidth, only a subset of the camera video streams are recorded for subsequent playback. When a user chooses to watch the recorded event, the transformation matrices are used to reconstruct those video streams which were not recorded. For example, only the left eye cameras may be recorded, and the transformation matrices may be used to reconstruct all of the right eye video streams.

In one embodiment, assuming that each left/right stream was captured, then a difference calculation unit may determine differences between the left and right streams. These differences can then be stored along with one of the two streams. For example, a disparity between adjacent streams (potentially from different pods) may be calculated and only one complete motion jpeg stream may be saved/transmitted. The other stream may be saved using differences between the motion jpeg stream and then reconstructed at the decoder, thereby removing a significant amount of redundancy.

Depth maps may also be generated and used by the algorithm to perform reconstruction of the original stream(s). For example, a monoscopic feed and a depth map may be used to reconstruct a stereo feed. The resolution of this depth map can be quite low. Disparity every inch, for example, is not required. At a low granularity, the depth map can be encoded using 8 bits total (e.g., granularity of 5-10 feet). Special types of processing may be performed for occluded objects (e.g., switching to data reduncancy).

Key and Fill Compositing

Figure 20:
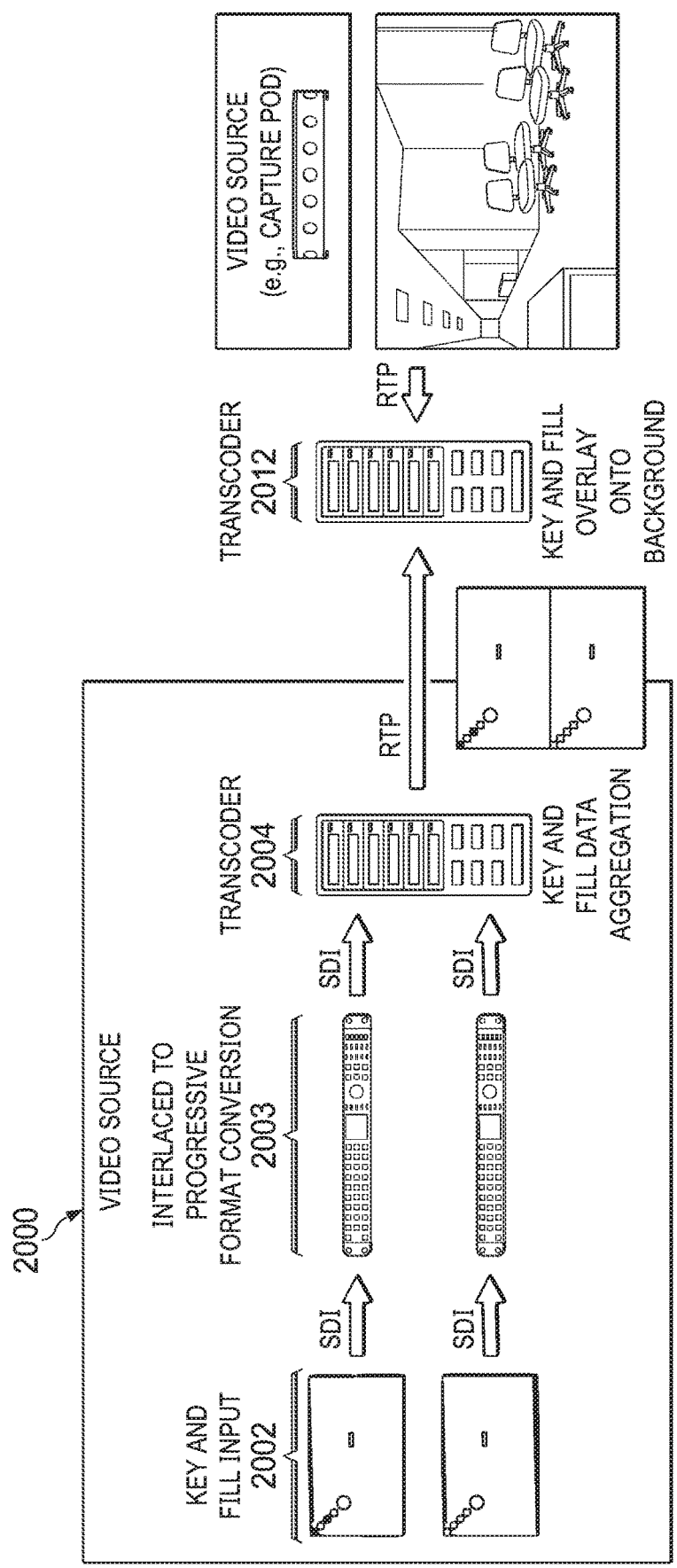
FIG. 20 illustrates one embodiment in which key and fill signals are used for inserting content into a captured video stream.

Referring to FIG. 20, one embodiment of the invention includes multiple transcoders 2004, 2012 to composite video or graphics from another source as a key and fill operation to the synchronized multi-camera VR feeds described herein. In one embodiment, the key is implemented as an alpha channel and fill is implemented as the color channel. A first video source 2000 receives key and fill input 2002 from one or more sources. Video processing circuitry/software 2003 equipped with a serial digital interface (SDI) (potentially on an SDI card) performs interlaced-to-progressive conversion. In one embodiment, this is accomplished by one or more Teranex standards converters, although the underlying principles of the invention are not limited to any particular digital video formats or converters.

After conversion, the progressive video streams are sent via one or more SDI outputs to a first transcoder 2004 which performs key and fill data aggregation on the inputs. The resulting stream is packetized and transmitted to a second transcoder 2012. In one embodiment, the Real-time Transport Protocol (RTP) is used for packetization and streaming, although the underlying principles of the invention are not limited to any particular transmission protocol. The second transcoder 2012 also receives a "background" video stream from a second video source 2010 which, in one implementation, is video captured by one or more capture PODs 1001. The second transcoder 2010 then overlays the key and fill stream onto the background video stream, effectively allowing different types of graphics and graphical effects to be displayed within the panoramic virtual reality image. In one embodiment, the overlay and background video are synchronized.

Parallax can be applied to the overlay so that the view can include depth effects within the panoramic virtual reality video. The composited video or graphics can be used to show event-related, real-time data (such as a game clock, score, statistics, or other relevant data) or can be used as virtual jumbotron and/or a virtual advertisement board.

In one embodiment, the background video is in received in a stereo format, with a left eye view and a right eye view. The overlay video received from video source 2000 may have two channels, one for color and one for transparency. The two videos are timestamped by a single synchronizer and transported over RTP. The transcoder 2012, which may be a compositing video server, receives and aggregates (buffers) timestamped video frames from both sources 2000, 2010 and finds matching frames based on the timestamps to composite the overlay video over the background video. When the overlay is composited, one embodiment of the transcoder 2012 applies parallax to the overlay (e.g., by locating the overlay in slightly different positions for the right and left eyes) to give the viewer a sense of depth in the virtual reality scene.

The embodiments described above provide the ability to composite video or graphics from another source as key and fill using the alpha channel and color channel, respectively, to the synchronized multi-camera virtual reality feeds (video source 2010).

Microservices Implementation

Some embodiments described herein employ a distributed architecture in which service components are accessed remotely through a remote-access protocol, so these components can communicate across different processes, servers and networks. Similar to Object-Oriented Design (OOD) in software architecture, distributed architectures lend themselves to more loosely coupled, encapsulated and modular applications. This in turn promotes improved scalability, modularity and control over development, testing, and deployment of back-end service modules.

In the context of a service-based architecture for a distributed VR broadcasting system as described herein, portions of the overall architecture may be encapsulated into independent services. For example, a first Microservice is used for heart-beat injection, a second Microservice for capture controls, a third Microservice for meta-data injection, and a fourth Microservice for real-time operation monitoring. All services may be developed and maintained independently but designed to work with the overall system.

This service-oriented approach is beneficial for a variety of reasons. First, different programming languages can be used for different services (e.g., C++, C #, Swift, etc). This works particularly well in environments where different team members have expertise in different areas. While some engineers are adding more features to one Microservice others can work on other Microservices concurrently. This helps parallelize the development effort for different deliverables.

Figure 21:
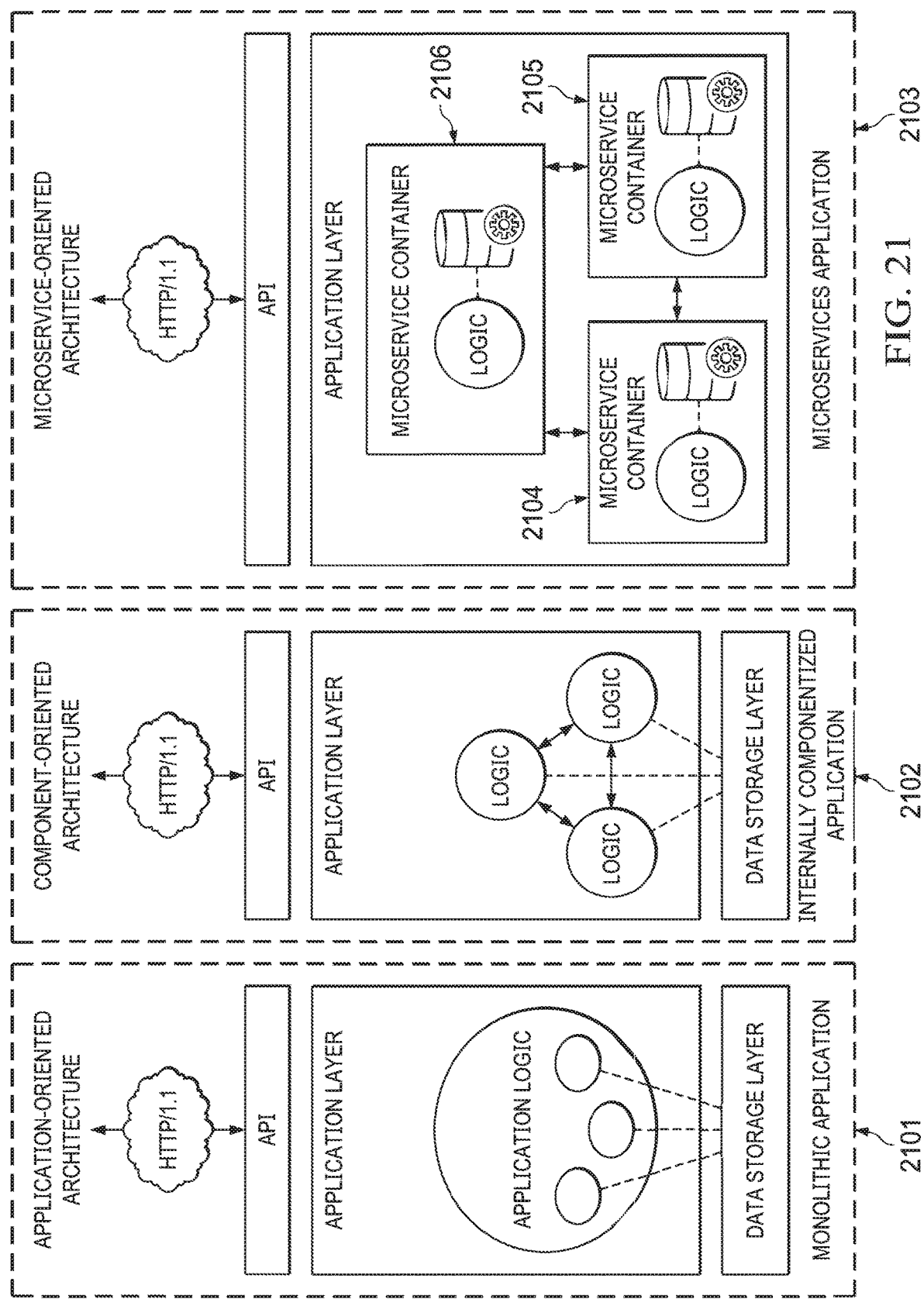
FIG. 21 illustrates a comparison between a microservices architecture and other architectures.

One of the differences between microservices and service-oriented architecture (SOA) is service granularity. The principle for microservices is to take the modularity of service-oriented architecture further into smaller and more manageable functional units. The concept of microservices, as compared with monolithic application 2101 and internally componentized application 2102, is illustrated in FIG. 21. The illustrated microservices application 2103 comprises a plurality of interconnected microservice components 2104-2105 which may be independently executed and updated.

Figure 22A:
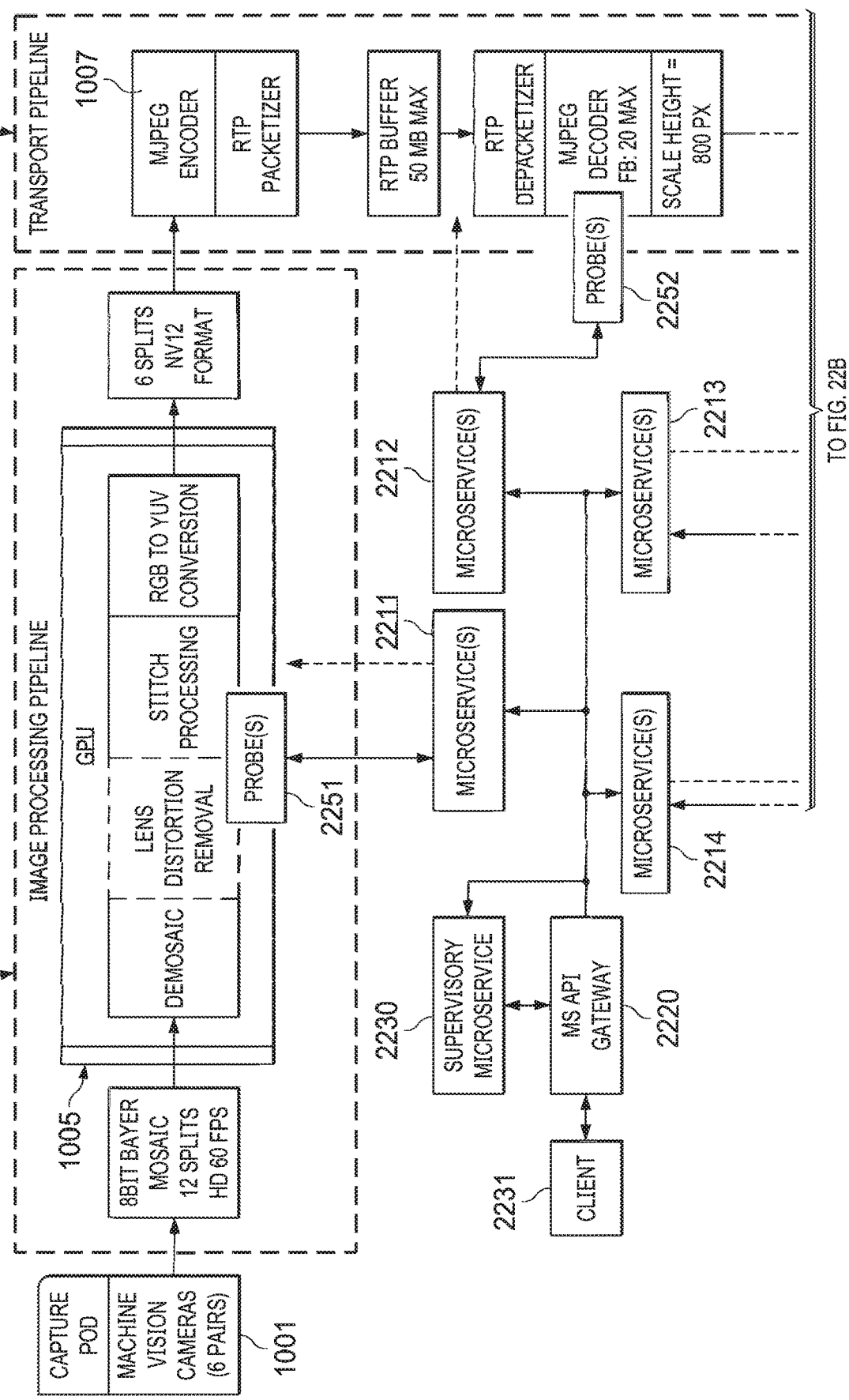
FIG. 22 illustrates microservices integrated within the architecture for capturing and streaming real time video.

In one embodiment, microservices are used to implement components of the virtual reality architecture described herein. FIG. 22 illustrates one such embodiment in which microservices 2211-2214 are executed to perform configuration, monitoring, and management of various portions of the panoramic virtual reality system. In this embodiment, the VR system is logically subdivided into components on which configuration, management, and monitoring may be performed. The particular example illustrated in FIG. 22 includes an image processing pipeline 2201, a transport pipeline 2202, a video encoding pipeline 2203, and a streaming/decoding/rendering pipeline 2204.

One or more probes 2251-2254 are configured to monitor operation of each respective processing component 2201-2204. In one embodiment, each probe 2251-2254 is executed on one or more servers within the processing component 2201-2204 for which it performs monitoring. The server may be the same server used to perform the pipeline processing functions or may be implemented as a dedicated monitoring/management/configuration server. Similarly, one or more servers may be deployed to support the various microservices 2211-2213.

In one embodiment, the probes 2251-2254 run continuously, monitoring various relevant quality metrics for each respective processing component 2201-2204 including, but not limited to, latency metrics, load/resource allocation metrics, and/or bandwidth metrics. The probes 2251-2254 report these quality metrics back to each respective microservice 2211-2213 which may implement a designated response (e.g., reallocating processing resources, offloading work from overloaded servers or GPUs, etc). Alternatively, or in addition, the microservices 2211-2213 may generate notifications to a supervisory microservice 2230 which is capable of rendering system-wide allocation decisions (e.g., moving processing resources from one processing component to another). Communication between the microservices 2211-2213 and the supervisory microservice may be direct or via a microservice API gateway 2220. One or more clients 2231 such as management consoles and/or GUI-based clients may provide user access the data compiled by the microservices 2211-2214, 2230 and to the user to configure the microservices to implement corrective responses.

In FIG. 22, the corrective responses are indicated by the dotted arrows originating from the microservices 2211-2213 to each respective processing component 2201-2204. Only one microservice 2211-2214 is illustrated for each processing component 2201-2204 for simplicity. However, in one embodiment, a first set of microservices may collect and analyze the data provided by the probes 2251-2254, while a second set of microservices, in communication with the first set, may implement corrective actions. By way of example, and not limitation, if the quality metrics indicate that the video encoding pipeline 2203 or some portion thereof has become overloaded (e.g., is experiencing quality degradation), then a load balancing microservice may allocate additional processing resources to the video encoding pipeline 2203 (e.g., allocating a new server or set of video encoding resources to handle the load with acceptable quality).

In one embodiment, the microservices 2211-2213, probes 2251-2254, and other configuration/monitoring/management components may implement remote procedure calls (RPCs) to perform the various operations described herein. However, the underlying principles of the invention are not limited to any particular techniques for distributed data collection and control.

Each microservice 2211-2213, 2230 may be deployed with a Docker container, making it easy for other scripts or executables to launch the microservices. Each physical server can host as few as one microservice container or as many as N containers. Orchestration tools such as Swarm and Kubernetes may be useful in managing the configuration and deployment of these microservice containers.

Figure 23:
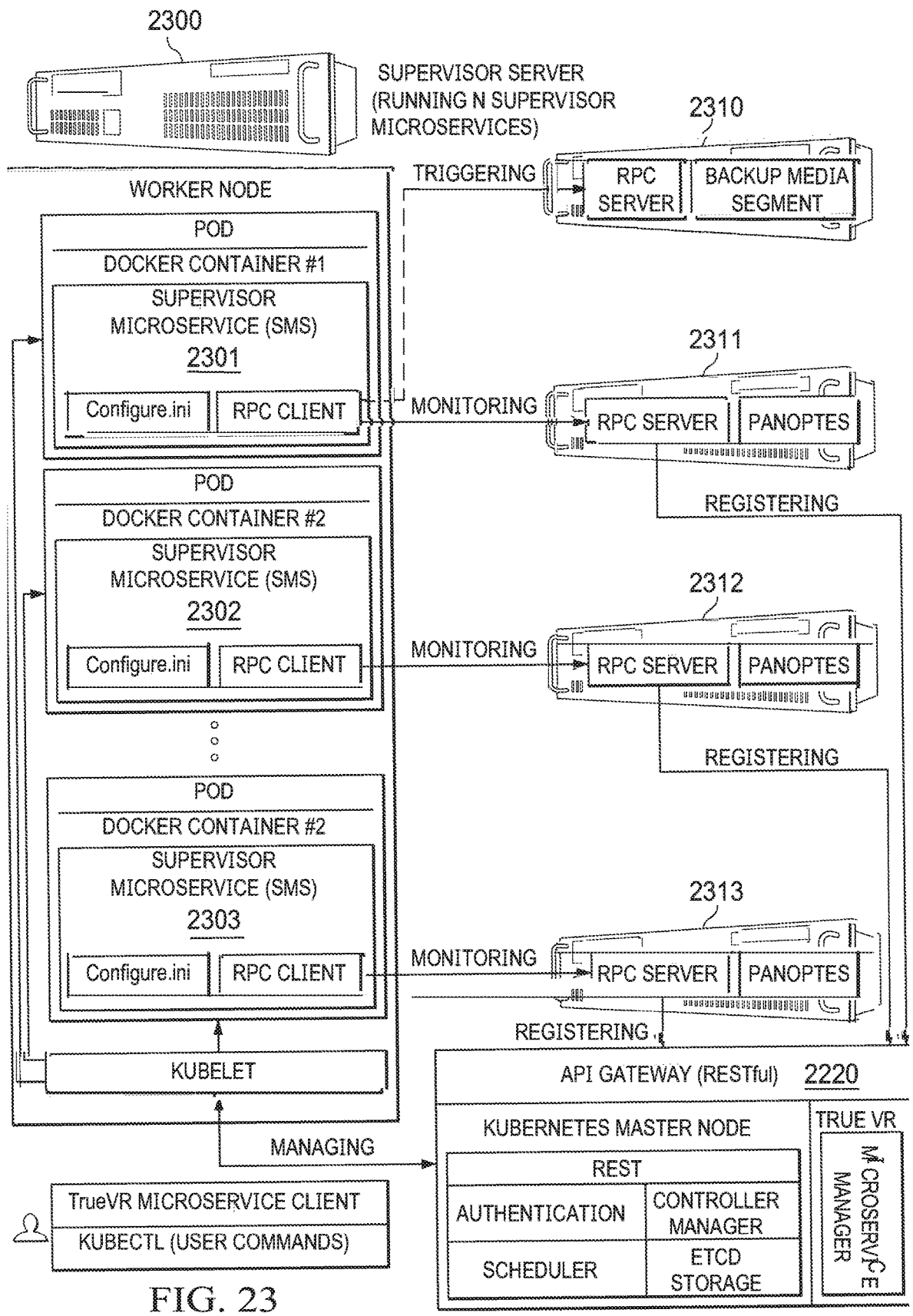
FIG. 23 illustrates a specific embodiment in which supervisory microservices query make monitoring requests to probes using RPC.

FIG. 23 illustrates one specific embodiment in which supervisory microservices 2301-2303 executed within Docker containers 1-3 on a supervisory server 2300 perform monitoring of different sets of processing resources 2311-2313, respectively. In this example, a monitoring request is generated by an RPC client on the supervisory microservices 2301-2303 and executed by an RPC server on the processing resources 2311-2313 (e.g., the probe is implemented as an RPC server).

Figure 24A:
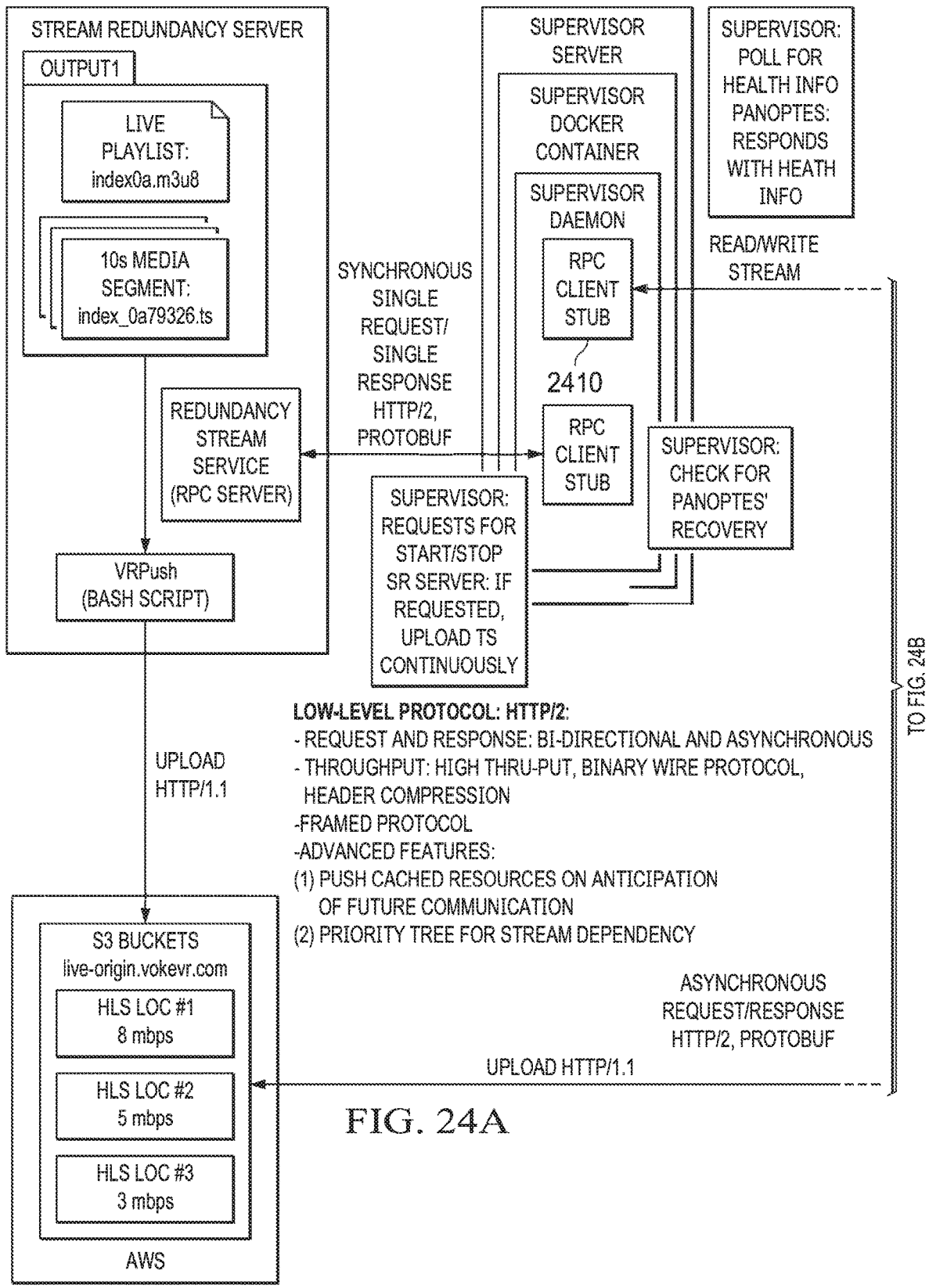
FIG. 24 illustrates another specific embodiment in which a completion queue supports communication between an RPC server and an RPC client.
Figure 24B:
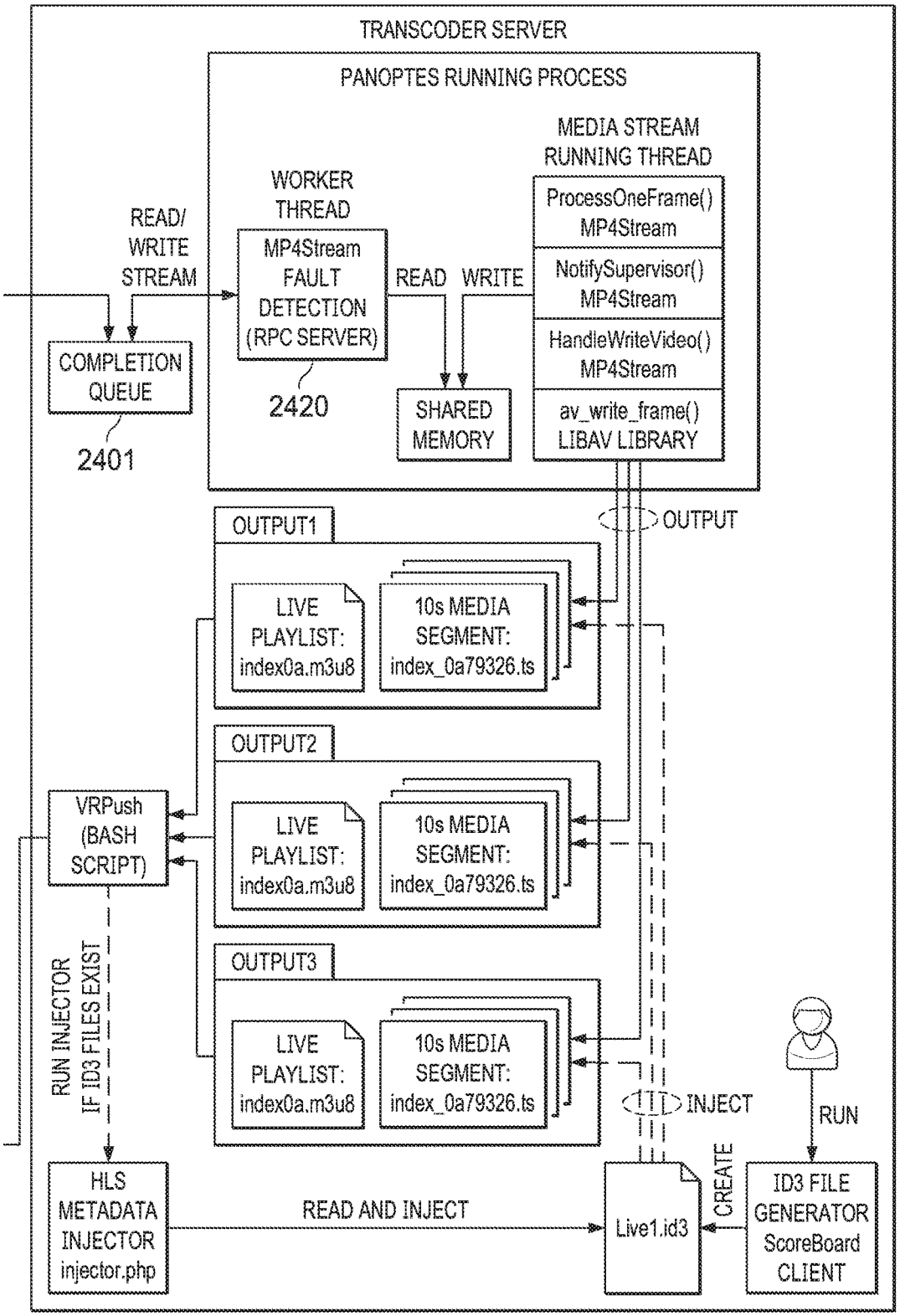
Figure 25:
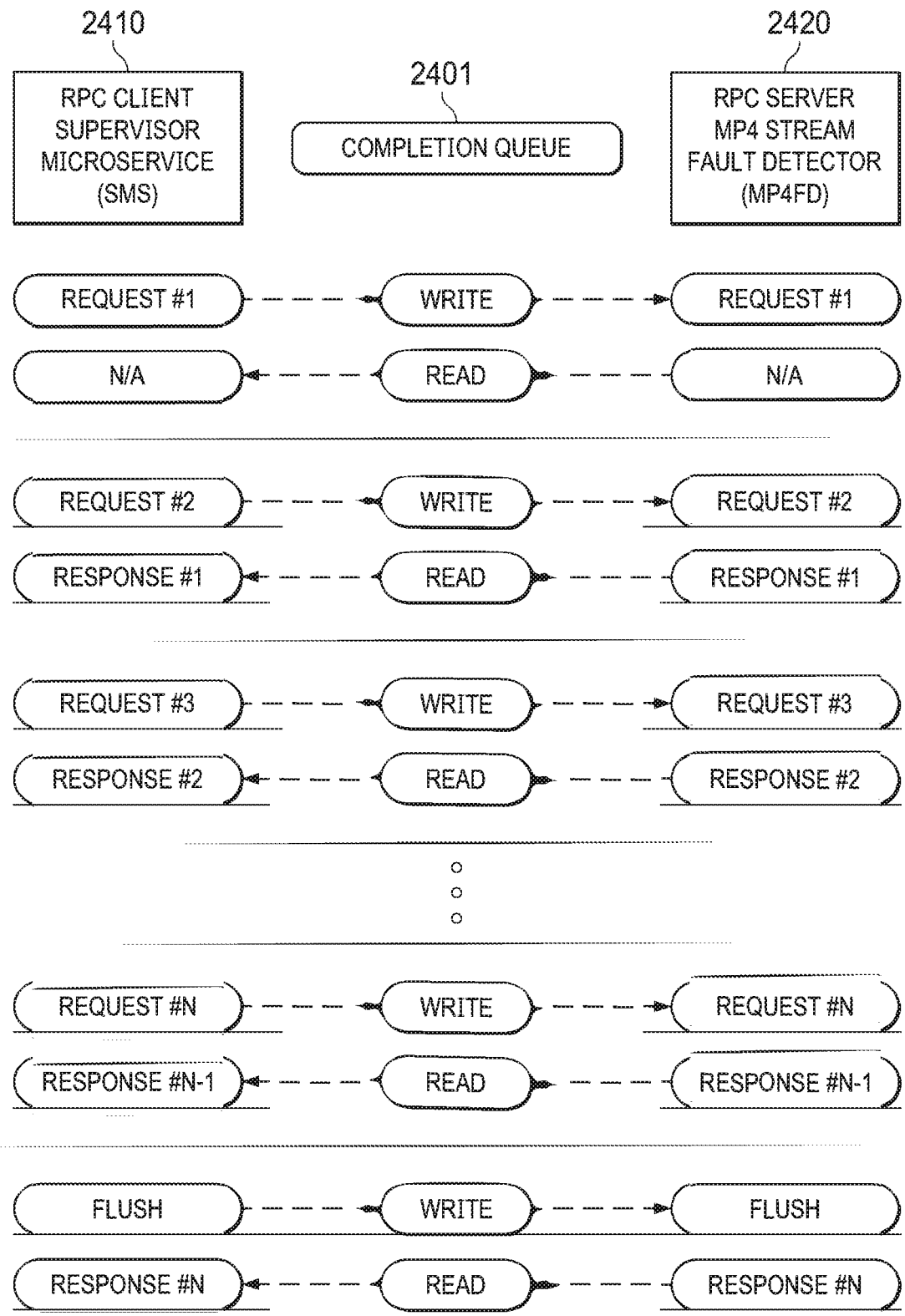
FIG. 25 illustrates sequences of read/write transactions between an RPC server and an RPC client.
Figure 26:
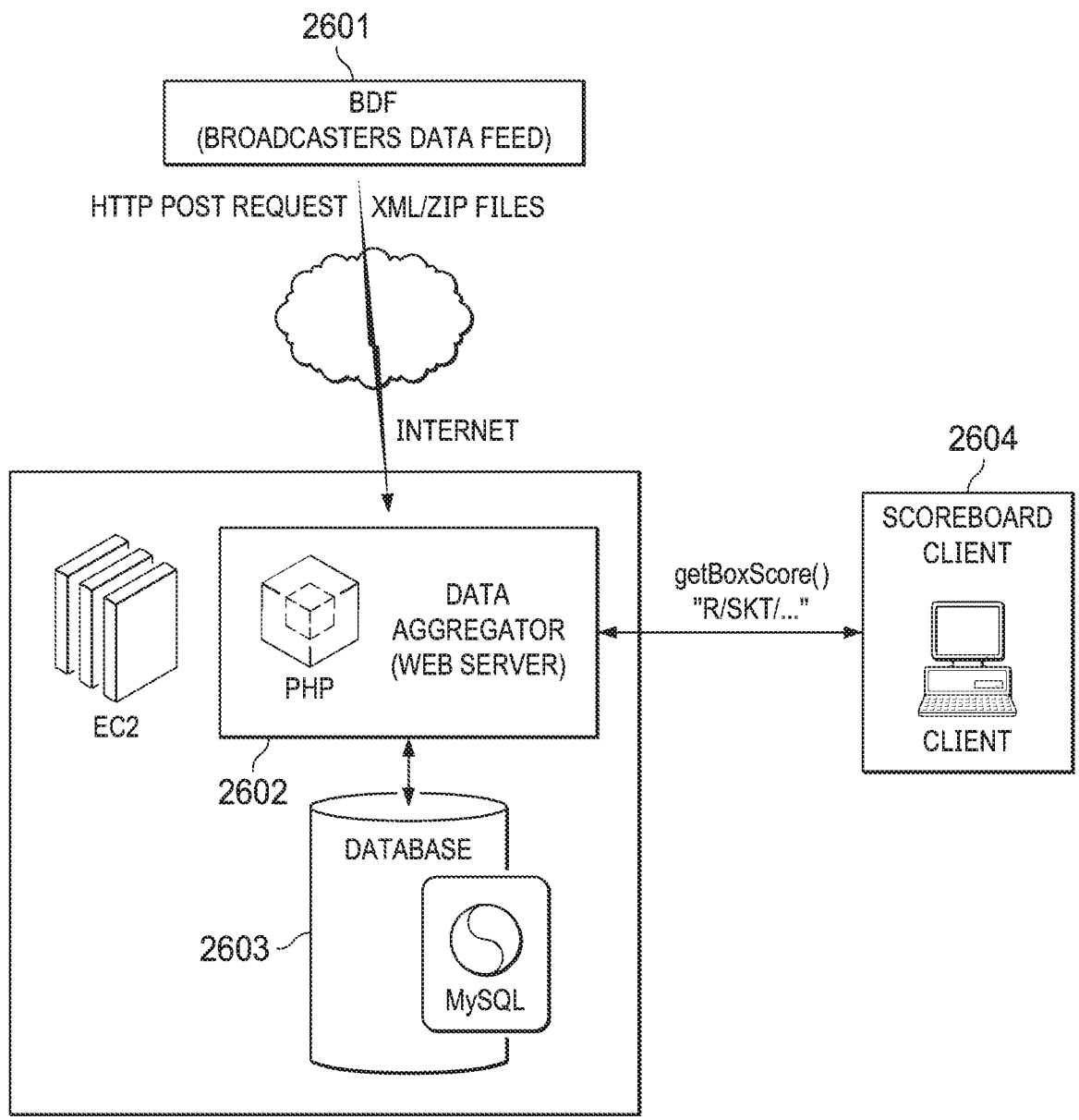
FIG. 26 illustrates one embodiment in which a broadcaster's data feed is integrated by a data aggregator.

Referring to FIG. 24, one embodiment of the bi-directional and aynchronous communication between SMS (Supervisor Microservice, RPC client) and MP4FD (MP4 Stream Fault Detector, RPC server) is implemented using a Completion Queue (CQ). At any time instance, CQ supports simultaneous read and write operations. That is, the RPC server and client can each put a command token in CQ. As a result, this implementation of SMS, the response is ignored in the first read/write cycle and the response handled in the next cycle when a new request is made. Before the tear down of the RPC client, SMS will send a "dummy" request to flush out the response of last request. The mechanism for simultaneous read/write operations is illustrated in FIG. 25.

A finite wait time between each read/write cycle RPC is implemented in one embodiment. Each RPC call is not instantaneous because there is an overhead communicating across the boundaries of physical computing machines. In fact, two successive read/write operations with no wait time between the calls would likely result in an RPC failure. In one implementation, 500 milliseconds is used as the default wait time.

Sporting Event Scoreboard Implementations

One embodiment of the invention is specifically tailored to a large-scale series of sporting events such as the Olympics. FIG. 16 illustrates a specific implementation which operates according to the following sequence of operations:

1. The sporting Broadcast Data Feed (BDF) 2601 pushes data by doing an HTTP POST to a registered endpoint.

2. The Scorecard Receiver, a data aggregator 2602, receives Request from BDF and stores the data in a database 2603 in an S3 instance.

3. Once the file is loaded in the S3 instance, it triggers an event to invoke the Parser Lambda.

4. Data Parser downloads the corresponding file from S3, processes the file and stores the required information in the database 2603.

5. Scorecard API Servers (EC2s part of an Auto-Scaling group) serve APIs called by mobile clients 2604 (through the content distribution network (CDN)).

6. Scoreboard client 2604 fetches the box score and injects it into the video stream as a part of the metadata.

The following are several examples of scoreboard data formats and user interfaces:

Ice Hockey

Sample Data

R\V1.1\IHO\WOG\1\SLO\AUT\1\2\0\0\1\2\99\05:00\0\00:00\10\
04:00\0\00:00\1\2017-04-20T16:50:10

Description

The response packet contains 23 fields separated by backslash characters. Here are the expected values of each field:

| FIELD | Description | VISUAL DISPLAY/ UX/UI |
|---|---|---|
| Field 1: Response packet type | Always 'R' | N/A |
| Field 2: Version Number | The version number for the current data format | No |
| Field 3: Sport Identifier | 'IHO' represents the ice hockey games | No |
| Field 4: League Identifier | 'WOG' stands for Winter Olympics Games | No |
| Field 5: Match ID | Game ID | No |
| Field 6: Away Team ID | Identifier for the away team | Yes |
| Field 7: Home Team ID | Identifier for the home team | Yes |
| Field 8: Away Team Score | Game score for the away team | Yes |
| Field 9: Home Team Score | Game score for the home team | Yes |
| Field 10: Away Team Penalty | A number of penalty for the away team | Yes |
| Field 11: Home Team Penalty | A number of penalty for the home team | Yes |
| Field 12: Away Team SOG | # of SOG (Shots On Goal) for the away team | Yes |
| Field 13: Home Team SOG | # of SOG (Shots On Goal) for the home team | Yes |
| Field 14: Away Team Player Number | Back Number for the first player receiving a penalty on the away team | Yes |
| Field 15: Away Team Penalty Minute | Penalty Minutes for the first player receiving a penalty on the away team | Yes |
| Field 16: Away Team Player Number | Back Number for the second player receiving a penalty on the away team | Yes |
| Field 17: Away Team Penalty Minute | Penalty Minutes for the second player receiving a penalty on the away team | Yes |
| Field 18: Home Team Player Number | Back Number for the first player receiving a penalty on the home team | Yes |
| Field 19: Home Team Penalty Minute | Penalty Minutes for the first player receiving a penalty on the home team | Yes |
| Field 20: Home Team Player Number | Back Number for the second player receiving a penalty on the home team | Yes |
| Field 21: Home Team Penalty Minute | Penalty Minutes for the second player receiving a penalty on the home team | Yes |
| Field 22: Period | Quarter (1-4), OT | Yes |
| Field 23: UTC Time stamp | UTC Timestamp | N/A |

Figures 27, 28, 29:
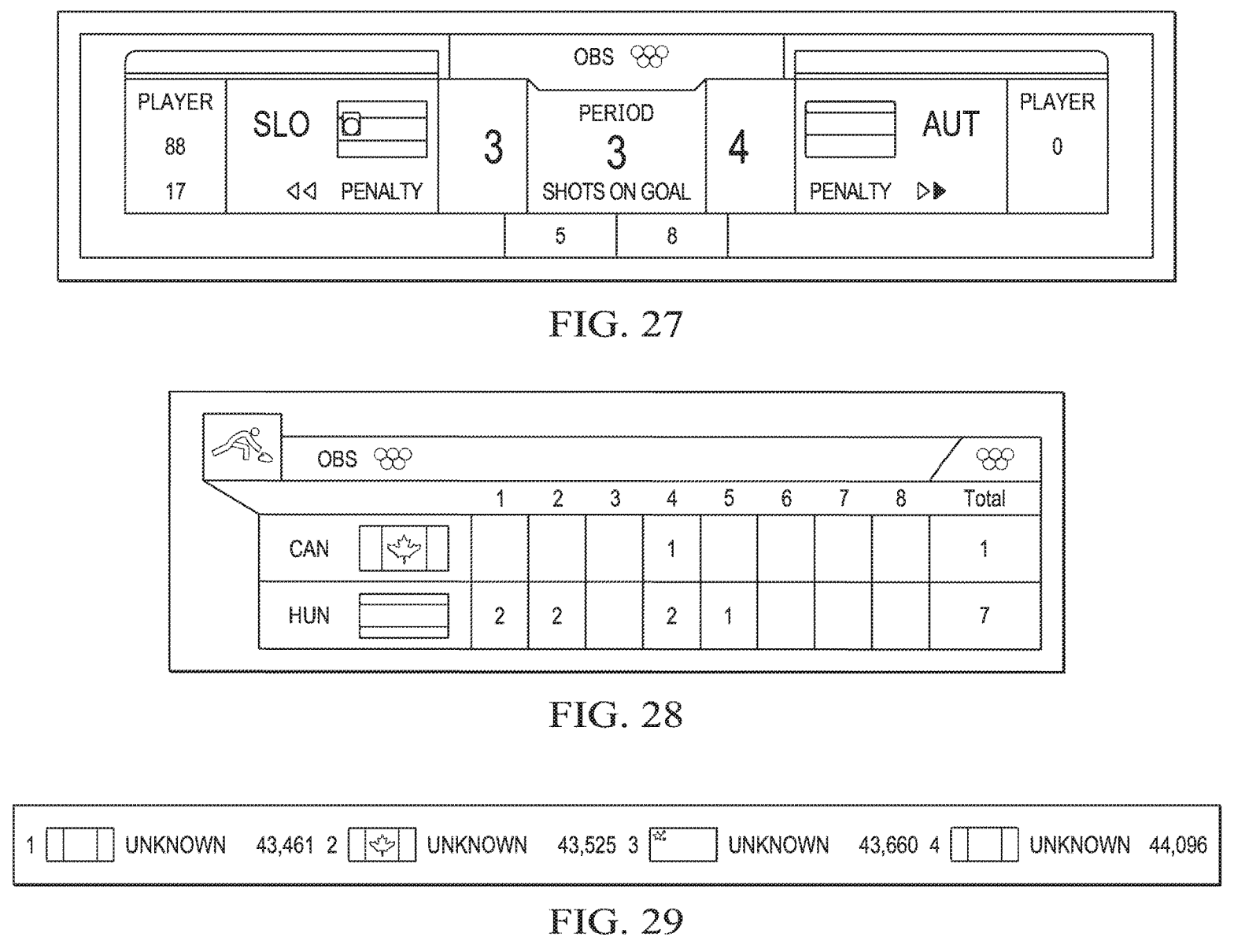

An example of a scoreboard user interface is illustrated in FIG. 27.

Curling

Sample Data

R\V1.2\CUR\WOG\1\CAN\HUN\1\11\0\0\0\1\0\0\0\0\0\2\2\0\2\1\4\0\0\0\7\2017-04-20T16:47:33

Description

The response packet contains 29 fields separated by backslash characters. Here are the expected values of each field:

| FIELD | Description | VISUAL DISPLAY/ UX/UI |
|---|---|---|
| Field 1: Response packet type | Always 'R' | N/A |
| Field 2: Version Number | The version number for the current data format | No |
| Field 3: Sport Identifier | 'CUR' represents the curling games | No |
| Field 4: League Identifier | 'WOG' stands for Winter Olympics Games | No |
| Field 5: Match ID | Game ID | No |
| Field 6: Away Team ID | Identifier for the away team | Yes |
| Field 7: Home Team ID | Identifier for the home team | Yes |
| Field 8: Away Team Score | Game score for the away team | Yes |
| Field 9: Home Team Score | Game score for the home team | Yes |
| Field 10~18: Away Team Score for Inning 1~9 or 10~18 | Inning score for the away team. When the current inning is less than or equal to 9, the fields contains scores from 1st through 9th inning. Otherwise, they will represent scores from 10th through 18th inning. | Yes |
| Field 19~27: Home Team Score for Inning 1~9 or 10~18 | Inning score for the home team. When the current inning is less than or equal to 9, the fields contains scores from 1st through 9th inning. Otherwise, they will represent scores from 10th through 18th inning. | Yes |
| Field 28: Current inning | Current Inning | No |
| Field 29: UTC Time stamp | UTC Timestamp | N/A |

An example user interface is illustrated in FIG. 28.

Other Sports

Sample Data

R\V1.1\STK\WOG\1\4\1840083\ITA\1\43.461\1840012\CAN\2\43.525\1840029\CHN\3\43.660\1840044\FRA\4\44.096\2017-04-20T16:47:33

Description

The response packet contains variant numbers of fields according to the number of players. Each field is separated by backslash characters and the maximum number of players should be 4.

The following are example values of each field:

| FIELD | Description | VISUAL DISPLAY/ UX/UI |
|---|---|---|
| Field 1: Response packet type | Always 'R' | N/A |
| Field 2: Version Number | The version number for the current data format | NO |
| Field 3: Sport Identifier | The available ID will be explained below. | NO |
| Field 4: League Identifier | 'WOG' stands for Winter Olympics Games | NO |
| Field 5: Match ID | Game ID | NO |
| Field 6: Number of Players | The Number of Players shown in the metadata | NO |

-continued

| FIELD | Description | VISUAL DISPLAY/ UX/UI |
|---|---|---|
| Field 7: Player ID | The identifier for the first player | YES |
| Field 8: Player Country Code | The country code for the first player | YES |
| Field 9: Player Rank | The rank of the first player | YES |
| Field 10: Player Score | The score of the first player | YES |
| Field 11: Player ID | The identifier for the second player | YES |
| Field 12: Player Country Code | The country code for the second player | YES |
| Field 13: Player Rank | The ranking for the second player | YES |
| Field 14: Player Score | The score of the second player | YES |
| Field 15: Player ID | The identifier for the third player | YES |
| Field 16: Player Country Code | The country code for the third player | YES |
| Field 17: Player Rank | The ranking for the third player | YES |
| Field 18: Player Score | The score of the third player | YES |
| Field 19: Player ID | The identifier for the fourth player | YES |
| Field 20: Player Country Code | The country code for the fourth player | YES |
| Field 21: Player Rank | The ranking for the fourth player | YES |
| Field 22: Player Score | The score of the fourth player | YES |
| Field 23: UTC Time Stamp | UTC Timestamp | N/A |

An example user interface is illustrated in FIG. 29.

Streaming and Formatting Implementations

Various different streaming protocols may be used to stream video captured at an event system-level processing components and/or client devices. In one embodiment, Real Time Streaming Protocol (RTMP) or a modified version of RTMP is used. In particular, one embodiment of the invention takes a 180°×60° or 180°×90° video stream and formats it for a 360° view. In one embodiment, this is done by filling in the space around the video frame with either static or dynamic content. This may be accomplished, for example, using a static overlay or dynamic overlay, respectively.

Traditional video sources for RTMP endpoints such as those found in social media platforms capture video with a spherical lens camera, allowing scenes to be rendered in a 360° view. Such video data can be delivered to 360° viewers without adjusting, altering or adding to the video data. However, not all video streams or live VR content is necessarily captured with 360° field of view (FOV) cameras. One embodiment of the cameras used, for example, capture video streams with cameras that have a 180° horizontal FOV. In order to deliver this content to standard RTMP clients with a 360° viewer, one embodiment of the invention not only transcodes video data to the appropriate resolutions and bitrates, but also ensures proper rendering in viewers by embedding static or dynamic content to complete a 360° view. Traditional VR apps have the 360° environment view statically built into the application and do not necessarily require the source stream to add this in the stream.

In one embodiment, the video capture engine (e.g., TrueVR) captures the video content, embeds static or dynamic content to complete a 360° view, transcodes the data to the correct resolution, rate, format and leverages a distribution server (e.g., a live streaming server such as Wowza) to forward and distribute the RTMP stream to the media endpoints.

In another embodiment, the video capture engine captures the video content, embeds static or dynamic content to complete a 360° view, transcodes the data to the correct resolution, rate, format and delivers the RTMP streams directly to the media endpoints.

To embed static content—such as 360° background overlays—into a live-media streaming system with minimal intrusion on the rest of the system, the one embodiment of the system employs a "constant-function" definition of static media, in which the static media is defined as a type of pseudo-video that produces the same frame repeatedly. This allows the system to use static media in any context in which standard video would have been allowed—most notably, as a background on which to overlay videos, be it for RTMP, HLS, or any other streaming protocol. One embodiment of the system also employs a caching mechanism to minimize the performance impact of this pseudo-video, so that it may re-use the same memory for each frame of the pseudo-video.

Asynchronous Batch Processing

The operation of MP4FD mentioned above can be best described as batch processing. For typical video transcoding sessions in Panoptes, MP4FD will collect about 90 frames (=60 fps*500 ms*3 outputs) in each COM.INTEL-.TRUEVR.SM.FD_GET_FRAME_INFO request. In every 500 ms, MP4FD sends a batch of 90 frame info samples to SMS asynchronously using gRPC.

(A.2) One Embodiment of Commands for Supervisor in Communicating with Panoptes (MP4 Stream Instance):

| | Name | Description |
|---|---|---|
| Request | | |
| CMD1 | COM.SM.FD_GET_DESTINATION | Retrieve the S3 bucket upload location from the current Panoptes process. |
| CMD2 | COM.SM.FD_START | Instruct the MP4Stream Fault Detector (running on a worker thread in an active Panoptes process) to start collecting frame information. |

-continued

| | Name | Description |
|---|---|---|
| CMD3 | COM.SM.FD_STOP | Unless the backup stream is writing to another S3 location than the main stream, we need to tell the main stream to stop writing to prevent overwriting files. This is needed when the main stream has non-total failures. |
| CMD4 | COM.SM.FD_RESTART | A stop/start combination command |
| CMD5 | COM.SM.FD_GET_FRAME_INFO | In each polling, supervisor will keep reading from the completion queue until no more READ tags remains. The frequency for polling may affect the overall performance. Supervisor should be configured to poll for frame data chunks in an time interval optimized for performance and latency tradeoffs. |
| Response | | |
| REPLY1 | COM.SM.FD_FRAME_INFO:xxxx: xxxxx\|xxxxxx: xxxxx | Respond with a sequence of framed data. Format: frame source is delimited by "\|" and frame data is delimited by ":" The first element is always the name of frame source, for example: COM.SM.FD_FRAME_INFO:SRC1:99:100:101: 105\|SRC2:88:89:91\|SRC3:100:101:103 |
| REPLY2 | COM.SM.FD_DESTINATION: xxx.xxx.xxxx.xxx: xxxxx | Respond with the S3 URI location Format: URI delimited by ":" |
| REPLY3 | COM.SM.FD_OK | Request is executed successfully. |
| REPLY4 | COM.SM.FD_INVALID | Request is not executed because of invalid parameter or request. |
| REPLY5 | COM.SM.FD_ERROR | Request is valid but there is an error. |

(B) Triggering Conditions for Failure Fallback

In one embodiment, a waterTank algorithm is implemented to detect the delayed or missed frame information. The water tank keeps draining at a constant drain rate while newly arrived frame info samples from MP4 fault detector fills up the water tank. When the tank is fully drained, SupervisorMicroservice::runFailureFallback( ) will be triggered to start the backup server.

Below is a list of configurable parameters for the algorithm:

| Parameter | Description |
|---|---|
| waterLevel | The initial water level to begin with. No unit is specified. The algorithm works as long as the same unit is used consistently across. |
| drainRate | The amount of water to be drained away periodically. Water drainage is triggered each time when DF_GET_FRAME_INFO is called. |

The following program output shows that a failure is detected when water level went below of zero mark:
*******Frames consumed: 16
Processing the TAG_TYPE . . .
Read a new message.
**Sending request::COM.SM.FD_GET_FRAME_INFO:8
water level=30.62
drain=28.62
water level=2
→Waterlevel: 2
Processing the TAG_TYPE . . .
Sending message asynchronously . . .
Received response:
COM.SM.FD_FRAME_INFO:src1:100:101:102:103: 104\|src2:99:100:101:102: 103:104\|src3:88:87:89:90:91
Token: CMD_SM_FD_FRANE_INFO
Total Frames Received: 16
*******Frames consumed: 16
Processing the TAG_TYPE . . .
Read a new message.
water level=18
drain=25.2
water level=-7.2
**Sending request::COM.SM.FD_GET_FRAME_INFO:9
water level=-7.2
drain=15.24
water level=-7.2
*****Failure Detected. Falling back to back up server,
Processing the TAG_TYPE . . .
Sending message asynchronously . . .
Received response:
COM.SM.FD_FRAME_INFO:src1:100:101:102:103: 104\|src2:99:100:101:102:103:104\|src3:88:87:89:90:91
Token: CMD_SM_FD_FRANE_INFO
Total Frames Received: 16
*******Frames consumed: 16
Processing the TAG_TYPE . . .
Read a new message.
SupervisorMS received::COM.SM.BU_OK Note: The triggering conditions and implementation of switch-back is out of scope here.

(C) Commands for Supervisor in communicating with Backup Server (Stream Redundancy)

Mode: synchronous, single request single response

| Name | | Description |
|---|---|---|
| Request | | |
| CMD1 | COM.SM.BU_SET_DESTINATION:xxx.xxx.xxx.xxx:50052 | Set the S3 bucket upload location for the backup stream server |
| CMD2 | COM.SM.BU_START | Run s3_upload script on the backup stream server with provided S3 upload URI |
| CMD3 | COM.SM.BU_STOP | Stop s3_upload script explicitly. |
| Response | | |
| REPLY1 | COM.SM.BU_OK | Request is executed successfully. |
| REPLY2 | COM.SM.BU_INVALID | Request is not executed because of invalid parameter or request. |
| REPLY3 | COM.SM.BU_ERROR | Request is valid but there is an error. |

Note: for N+1 Backup scheme, supervisor microservice needs to block out new requests when there is an existing session.

Configuring Supervisor Microservice (SMS)

| Configuration | Condition | Description |
|---|---|---|
| SupervisorConfigure.h | static, compile time | hard coded default values for configurable parameters; intended for serving as fallback when parameters have not been set properly. |
| SMS.config | static, run time | assigned values for configurable parameters, loaded once during object instantiation; suitable for scripting and one time initialization. |
| RPC Commands | variable, run time | commands for assigning new configurable parameters via RPC; intending for modifying a configurable object's behavior. |

Deployment of Supervisor Microservice (SMS)

For fault tolerance and stream redundancy, a SM instance is run independently of Panoteps process. There could be one or many instances of SM in a physical server. Alternatively, each SM instance could be running on a Lambda instance in the cloud such as Amazon Web Services (AWS). If we want to adopt AWS only back-end architecture, Lambda based deployment will work seamlessly with AWS gateway, S3 storage and EC2 instances.

A recommended way, however, is to deploy a SM instance in a Docker container. In a virtualized environment, there could be many containers in a physical server while the logics and I/O of each SM instance are independently contained. The physical machine can simply be an additional server running next to the existing transcoder servers. This approach based on Docker container gives us the maximum flexibility when it comes to design our back-end server-based or server-less architecture.

One embodiment of the invention uses a unicast IP protocol such as RTMP which utilizes the connection-based TCP protocol for transmitting medium-volumes of media with low latency and guarantees that packets will arrive in order, which means error handling on the client-side is minimal.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processor comprising:
a video interface to receive a first plurality of images from a corresponding first plurality of cameras;
an image rectifier to perform a perspective re-projection of at least some of the first plurality of images to a common image plane to generate a rectified first plurality of images;
a stitcher to analyze overlapping regions of adjacent images in the rectified first plurality and to identify corresponding pixels in the overlapping regions and to stitch the adjacent images in accordance with the corresponding pixels to generate a panoramic image comprising a stitched combination of the rectified first plurality of images, wherein the stitcher is to analyze the overlapping regions by executing a sequence of Belief Propagation operations that comprise:
construction of an initial data cost volume using pixel data in the overlapping regions;
construction of a data cost pyramid based on the initial data cost volume comprising a series of smaller volumes;
iteration through the series of smaller volumes and the initial volume using Belief Propagation message passing to generate a final set of costs; and
construction of a stitch map from the final set of costs; and
a cylindrical projector to project the panoramic image onto a cylindrical surface to generate a final panoramic video image to be used to implement a virtual reality (VR) environment on a VR apparatus.

2. The graphics processor of claim 1 wherein the stitcher is to stitch the adjacent images in accordance with the final set of costs.

3. The graphics processor of claim 2 wherein for each pixel in the overlapping region the stitcher is to use the stitch map to determine which pixels to blend.

4. The graphics processor of claim 3 wherein the stitcher is to use a convex linear combination of pixels to blend from each image.

5. The graphics processor of claim 1 further comprising:
a lookahead buffer to store stitching parameters determined from one or more prior images, the stitcher to use at least a portion of the stitching parameters stored in the lookahead buffer to stitch the adjacent images in the rectified first plurality of images.

6. The graphics processor of claim 1 wherein the perspective re-projection comprises a homography transformation.

7. The graphics processor of claim 1 wherein the first plurality of images comprise left images to be displayed, following processing, in a left display of the VR apparatus.

8. The graphics processor of claim 7 wherein the video interface is to receive a right plurality of images from a corresponding second plurality of cameras,
wherein the image rectifier is to perform a perspective re-projection of at least some of the right plurality of images to a common image plane,
wherein the stitcher is to analyze overlapping regions of adjacent images in the right plurality and to identify corresponding pixels in the overlapping regions and to stitch the adjacent images in accordance with the corresponding pixels to generate a panoramic right eye image comprising a stitched combination of the right plurality of images; and
wherein the cylindrical projector is to project the panoramic right eye image onto a cylindrical surface to generate a final panoramic right eye image to be combined with a final panoramic left eye image to implement a virtual reality (VR) environment on a VR apparatus.

9. The graphics processor of claim 1 wherein the image rectifier, stitcher, and cylindrical projector comprise circuitry and/or executable software executed by an execution unit of the graphics processor.

10. A method comprising:
receiving a first plurality of images from a corresponding first plurality of cameras;
performing a perspective re-projection of at least some of the first plurality of images to a common image plane to generate a rectified first plurality of images;
analyzing overlapping regions of adjacent images in the rectified first plurality by performing a sequence of Belief Propagation operations and responsively identifying corresponding pixels in the overlapping regions, wherein the sequence of Belief Propagation operations comprise:
constructing an initial data cost volume using pixel data in the overlapping regions;
constructing a data cost pyramid based on the initial data cost volume comprising a series of smaller volumes;
iterating through the series of smaller volumes and the initial volume using Belief Propagation message passing to generate a final set of costs; and
constructing a stitch map from the final set of costs;
stitching the adjacent images in accordance with the corresponding pixels to generate a panoramic image comprising a stitched combination of the rectified first plurality of images; and
projecting the panoramic image onto a cylindrical surface to generate a final panoramic video image to be used to implement a virtual reality (VR) environment on a VR apparatus.

11. The method of claim 10 wherein stitching comprises stitching the adjacent images in accordance with the final set of costs.

12. The method of claim 11 wherein for each pixel in the overlapping region the stitch map is used to determine which pixels to blend.

13. The method of claim 12 wherein a convex linear combination of pixels is selected to blend from each image.

14. The method of claim 10 further comprising:
storing stitching parameters determined from one or more prior images, and
stitching the adjacent images in the rectified first plurality of images using at least a portion of the stitching parameters.

15. The method of claim 10 wherein the perspective re-projection comprises a homography transformation.

16. The method of claim 10 wherein the first plurality of images comprise left images to be displayed, following processing, in a left display of the VR apparatus.

17. The method of claim 16 wherein the video interface is to receive a right plurality of images from a corresponding second plurality of cameras, the method further comprising:
performing a perspective re-projection of at least some of the right plurality of images to a common image plane to generate rectified right plurality of images;
analyzing overlapping regions of adjacent images in the rectified right plurality and identifying corresponding pixels in the overlapping regions; and
stitching the adjacent images in accordance with the corresponding pixels to generate a panoramic right eye image comprising a stitched combination of the rectified right plurality of images; and projecting the panoramic right eye image onto a cylindrical surface to generate a final panoramic right eye image to be combined with a final panoramic left eye image to implement a virtual reality (VR) environment on a VR apparatus.

18. A non-transitory machine-readable medium having program code stored thereon which, when executed by a machine, causes the machine to perform operations of:
receiving a first plurality of images from a corresponding first plurality of cameras;
performing a perspective re-projection of at least some of the first plurality of images to a common image plane to generate a rectified first plurality of images;
analyzing overlapping regions of adjacent images in the rectified first plurality by performing a sequence of Belief Propagation operations and responsively identifying corresponding pixels in the overlapping regions, wherein the sequence of Belief Propagation operations comprise:
constructing an initial data cost volume using pixel data in the overlapping regions;
constructing a data cost pyramid based on the initial data cost volume comprising a series of smaller volumes;
iterating through the series of smaller volumes and the initial volume using Belief Propagation message passing to generate a final set of costs; and
constructing a stitch map from the final set of costs;
stitching the adjacent images in accordance with the corresponding pixels to generate a panoramic image comprising a stitched combination of the rectified first plurality of images; and
projecting the panoramic image onto a cylindrical surface to generate a final panoramic video image to be used to implement a virtual reality (VR) environment on a VR apparatus.

19. The non-transitory machine-readable medium of claim 18 wherein stitching comprises stitching the adjacent images in accordance with the final set of costs.

20. The non-transitory machine-readable medium of claim 19 wherein for each pixel in the overlapping region the stitch map is used to determine which pixels to blend.

21. The non-transitory machine-readable medium of claim 20 wherein a convex linear combination of pixels is selected to blend from each image.

22. The non-transitory machine-readable medium of claim 18 wherein the operations further comprise:
storing stitching parameters determined from one or more prior images, and
stitching the adjacent images in the rectified first plurality of images using at least a portion of the stitching parameters.

23. The non-transitory machine-readable medium of claim 18 wherein the perspective re-projection comprises a homography transformation.

24. The non-transitory machine-readable medium of claim 18 wherein the first plurality of images comprise left images to be displayed, following processing, in a left display of the VR apparatus.

25. The non-transitory machine-readable medium of claim 24 wherein the video interface is to receive a right plurality of images from a corresponding second plurality of cameras, the operations further comprising:
performing a perspective re-projection of at least some of the right plurality of images to a common image plane to generate rectified right plurality of images;
analyzing overlapping regions of adjacent images in the rectified right plurality and identifying corresponding pixels in the overlapping regions; and
stitching the adjacent images in accordance with the corresponding pixels to generate a panoramic right eye image comprising a stitched combination of the rectified right plurality of images; and
projecting the panoramic right eye image onto a cylindrical surface to generate a final panoramic right eye image to be combined with a final panoramic left eye image to implement a virtual reality (VR) environment on a VR apparatus.

* * * * *